US012785022B2

(12) United States Patent
Islam et al.

(10) Patent No.: US 12,785,022 B2
(45) Date of Patent: Nov. 3, 2026

(54) TECHNIQUE FOR MULTI-STREAM ELECTRON BEAM GENERATION WITH DIFFERENT ENERGIES AND COMPARABLE CURRENTS FROM A SINGLE CATHODE POTENTIAL FOR HIGH POWER MICROWAVE SOURCES

(71) Applicant: UNM RAINFOREST INNOVATIONS, Albuquerque, NM (US)

(72) Inventors: Khandakar Nusrat Islam, Albuquerque, NM (US); Edl Schamiloglu, Albuquerque, NM (US)

(73) Assignee: UNM RAINFOREST INNOVATIONS, Albuquerque, NM (US)

( * ) Notice: Subject to any disclaimer, the term of this patent is extended or adjusted under 35 U.S.C. 154(b) by 639 days.

(21) Appl. No.: 18/338,659

(22) Filed: Jun. 21, 2023

(65) Prior Publication Data

US 2023/0420212 A1 Dec. 28, 2023

Related U.S. Application Data

(60) Provisional application No. 63/355,794, filed on Jun. 27, 2022.

(51) Int. Cl.
*H01J 23/04* (2006.01)
*H01J 25/34* (2006.01)

(52) U.S. Cl.
CPC .............. *H01J 23/04* (2013.01); *H01J 25/34* (2013.01)

(58) Field of Classification Search
CPC .................................. H01J 23/04; H01J 25/04
See application file for complete search history.

(56) References Cited

U.S. PATENT DOCUMENTS 3,934,167 A * 1/1976 Ponsen .................. H01J 17/44 313/575
5,399,935 A * 3/1995 Santonja .............. H01J 23/065 313/471
10,490,383 B2 * 11/2019 Bel .......................... H03F 3/02

OTHER PUBLICATIONS

Islam, K. N., et al. "Modeling and simulation of relativistic multiple electron beam generation with different energies from a single-cathode potential for high-power microwave sources." IEEE Transactions on Electron Devices 69.3 (2022): 1380-1388. (Year: 2022).*

(Continued)

*Primary Examiner* — Evan P Dzierzynski
*Assistant Examiner* — Nathaniel J Lee
(74) *Attorney, Agent, or Firm* — MH2 Technology Law Group LLP

(57) ABSTRACT

A method for generating multi-stream electron beams is disclosed, the method including connecting an inner cathode to a cathode stalk, connecting an outer cathode to the cathode stalk, driving the cathode stalk with a pulsed power generator at a single potential, producing a first electron beam from the inner cathode, and producing a second electron beam from the outer cathode. Implementations of the method for generating multi-stream electron beams may include where each of the inner cathode and the outer cathode may include nested magnetically insulated coaxial diodes (MICDs). The first electron beam and the second electron beam can be generated with different energies. A multi-stream traveling wave tube (TWT) and an electron beam generating apparatus are also described.

18 Claims, 15 Drawing Sheets

(56) References Cited

OTHER PUBLICATIONS

Islam, K. N., et al. "Analytical and Simulation Study of Multibeam Electron Generation for High Power Microwave Sources." 2021 IEEE International Conference on Plasma Science (ICOPS). IEEE, 2021.

Islam, K. N., et al. "Multiple electron beam generation with different energies and comparable currents from a single cathode potential for high power traveling wave tubes (TWTs)." Journal of Applied Physics 131.4 (2022): 044901.

Islam, K. N., et al. "Modeling and simulation of relativistic multiple electron beam generation with different energies from a single-cathode potential for high-power microwave sources." IEEE Transactions on Electron Devices 69.3 (2022): 1380-1388.

* cited by examiner

TECHNIQUE FOR MULTI-STREAM ELECTRON BEAM GENERATION WITH DIFFERENT ENERGIES AND COMPARABLE CURRENTS FROM A SINGLE CATHODE POTENTIAL FOR HIGH POWER MICROWAVE SOURCES

REFERENCE TO RELATED APPLICATIONS

This application claims the benefit of U.S. Provisional Patent Application No. 63/355,794, filed on Jun. 27, 2022, which is hereby incorporated by reference in its entirety.

STATEMENT OF GOVERNMENT INTEREST

This invention was made with government support under FA9550-19-1-0103 and FA9550-20-1-0409, awarded by AFOSR. The government has certain rights in the invention.

TECHNICAL FIELD

The present teachings relate generally to the field of multi-stream traveling wave tubes, and more particularly to traveling wave tubes having multi-stream operation at different energies and comparable currents from a single cathode stalk at a single potential.

BACKGROUND

For multiple-stream electron beam generation in high-power microwave (HPM) sources, the first challenge is how to generate multiple beams with different energies and comparable currents from a single cathode stalk at a single potential driven by a pulsed power generator. To generate more power from an HPM source, one can increase the applied voltage to the electron beam of the vacuum device, but that will require a larger vacuum channel and a more complex power supply. Or one can increase the electron beam's current, but that increases the space charge and makes confinement more challenging. In addition, the device's efficiency can decrease with higher current.

There has been work done in the past that has studied multiple cathode sources to produce multiple electron beams where each cathode is powered using a separate power supply at different voltages. However, for HPM generation using a pulsed power generator, it is not practical to use separate power supplies to individually power separate cathodes. Therefore, we need to identify a technique to generate multiple electron beams with different energies and comparable currents from a single cathode stalk at a single potential. The goal is to achieve a 10-20% difference in energies from the two beams with comparable currents by applying a single power supply.

To-date, there has been very little work done on dual-beam amplifiers. The concept of a two-beam amplifier was first proposed by Pierce and Haeff. But both designs were for low voltages/low powers and used separate supplies to power two cathodes. There are some publications from Bell Laboratories (Hollenberg) and from the Radio Corporation of America (RCA) (i.e., Neergard) where actual designs of two-beam devices are shown. But they also used relatively low voltages and two electron guns and, thus, it is easy to implement using two separate power supplies. Recent publications by Los Alamos National Laboratory (LANL) describe how the two-stream instability using counter-streaming electron beams can be used for THz generation.

Another recent work describes a two-electron-gun-powered traveling wave tube (TWT) operated at relatively low voltages.

One of the greatest challenges in designing an HPM multi-stream TWT amplifier is how to generate two or more electron beams with different energies and with comparable currents from a single cathode at a single potential driven by a pulsed power generator.

Therefore, it is desirable to explore a two electron beam device with different energies and comparable currents that is generated from a single cathode stalk at a single potential. It is also desirable to explore the theory of generating two beams with 10-20% energy difference and comparable currents for use in a two-beam TWT amplifier and validate the theory and simulations in experiment. Specific exploration of the relationship between the current-voltage and energy-voltage characteristics of intense multiple electron beams transported in a vacuum channel is also of interest. Understanding the link between the electron beam current and electron beam energy will help to guide the experiments with multiple electron beam generation.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A method for generating multi-stream electron beams is disclosed, the method including connecting an inner cathode to a cathode stalk, connecting an outer cathode to the cathode stalk, driving the cathode stalk with a pulsed power generator at a single potential, producing a first electron beam from the inner cathode, and producing a second electron beam from the outer cathode. Implementations of the method for generating multi-stream electron beams may include where each of the inner cathode and the outer cathode may include nested magnetically insulated coaxial diodes (MICDs). The first electron beam and the second electron beam can be generated with different energies. The first electron beam and the second electron beam can have an energy difference of from about 5% to about 30%. The first electron beam and the second electron beam can have an energy difference of about 10%. The first electron beam and the second electron beam can each be generated with a comparable current. The method for generating multi-stream electron beams may include applying a voltage to the cathode stalk of from about 100 kV to about 500 kV. The method for generating multi-stream electron beams may include generating an electron beam density of from about $2\times10^{12}/cm^3$ to about $6\times10^{12}/cm^3$. A radius of the inner beam ($r_{ib}$) is from about 0.25 cm to about 0.8 cm with 0.02 cm thickness. A radius of the inner cathode ($r_{ic}$) is from about 0.25 cm to about 0.8 cm, with a thickness of 0.02 cm. The method for generating multi-stream electron beams a radius of the inner cathode ($r_{ic}$) is 0.7 cm, with a thickness of 0.02 cm. A radius of the outer beam ($r_{ob}$) is 0.69 cm, with a 0.02 cm thickness.

A multi-stream traveling wave tube (TWT) is disclosed. The multi-stream traveling wave tube includes a cathode stalk, an inner cathode coupled to the cathode stalk, and an outer cathode coupled to the cathode stalk. The multi-stream traveling wave tube also includes where a first electron beam and a second electron beam have an energy difference of from about 5% to about 30%.

An electron beam generating apparatus is disclosed. The electron beam generating apparatus includes a cathode stalk, an inner cathode coupled to the cathode stalk, and an outer cathode coupled to the cathode stalk. The electron beam generating apparatus also includes where a first electron beam and a second electron beam have an energy difference of from about 5% to about 30%.

Implementations of the electron beam generating apparatus includes where the electron beam generating apparatus generates a first electron beam and a second electron beam. A radius of the inner cathode is different from a radius of the outer cathode. A radius of the inner cathode can be the same as a radius of the outer cathode. The electron beam generating apparatus may include a pulsed power generator configured to apply a voltage of from about 100 kV to about 500 kV to the cathode stalk. A radius of the inner cathode ($i_{ib}$) is from about 0.25 cm to about 0.8 cm, and a radius of the outer cathode ($i_{ob}$) is from about 0.25 cm to about 0.8 cm with a thickness of 0.02 cm. A radius of the inner cathode ($i_{ib}$) is 0.675 cm; and a radius of the outer cathode ($i_{ob}$) is 0.9 cm.

The features, functions, and advantages that have been discussed can be achieved independently in various implementations or can be combined in yet other implementations further details of which can be seen with reference to the following description.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures:

FIG. 6A depicts the calculated 'outer' electron beam energy and the filled circles associated with corresponding MAGIC PIC simulated 'outer' electron beam energy, and FIG. 6B shows the calculated 'inner' electron beam energy associated with corresponding MAGIC PIC simulated 'inner' electron beam energy for different applied voltages ranging from 100-500 kV for a magnetic field of 3 T, with a total simulation time of 10 ns, in accordance with the present disclosure.

FIG. 7A shows the calculated 'outer' electron beam energy and the associated corresponding MAGIC PIC simulated 'outer' electron beam energy, and FIG. 7B shows the calculated 'inner' electron beam energy and the associated corresponding MAGIC PIC simulated 'inner' electron beam energy for different applied voltages ranging from 100-500 kV for a magnetic field of 3 T, with a total simulation time of 10 ns, in accordance with the present disclosure.

in accordance with the present disclosure.

Figure 9A:
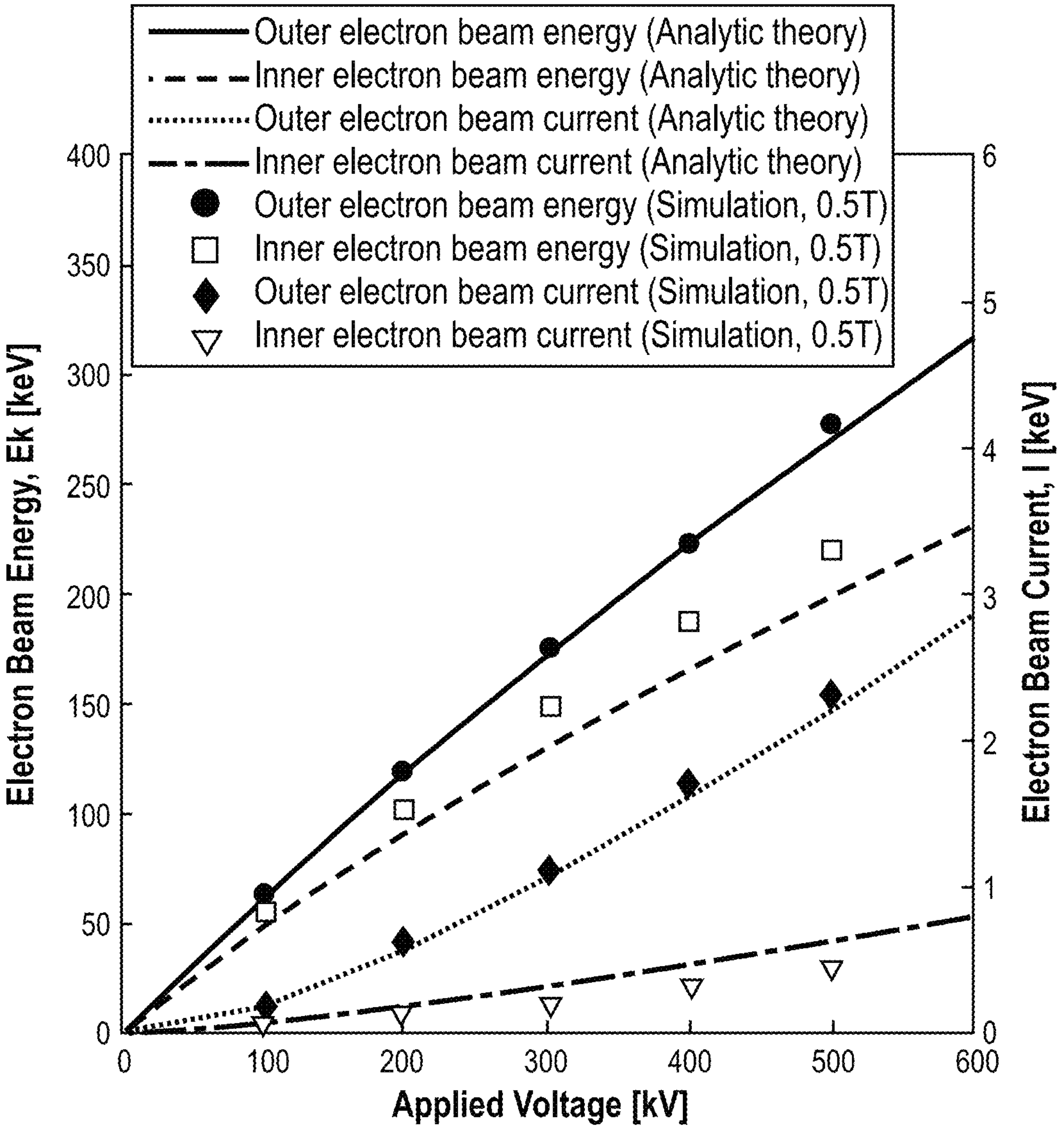
Figure 9B:
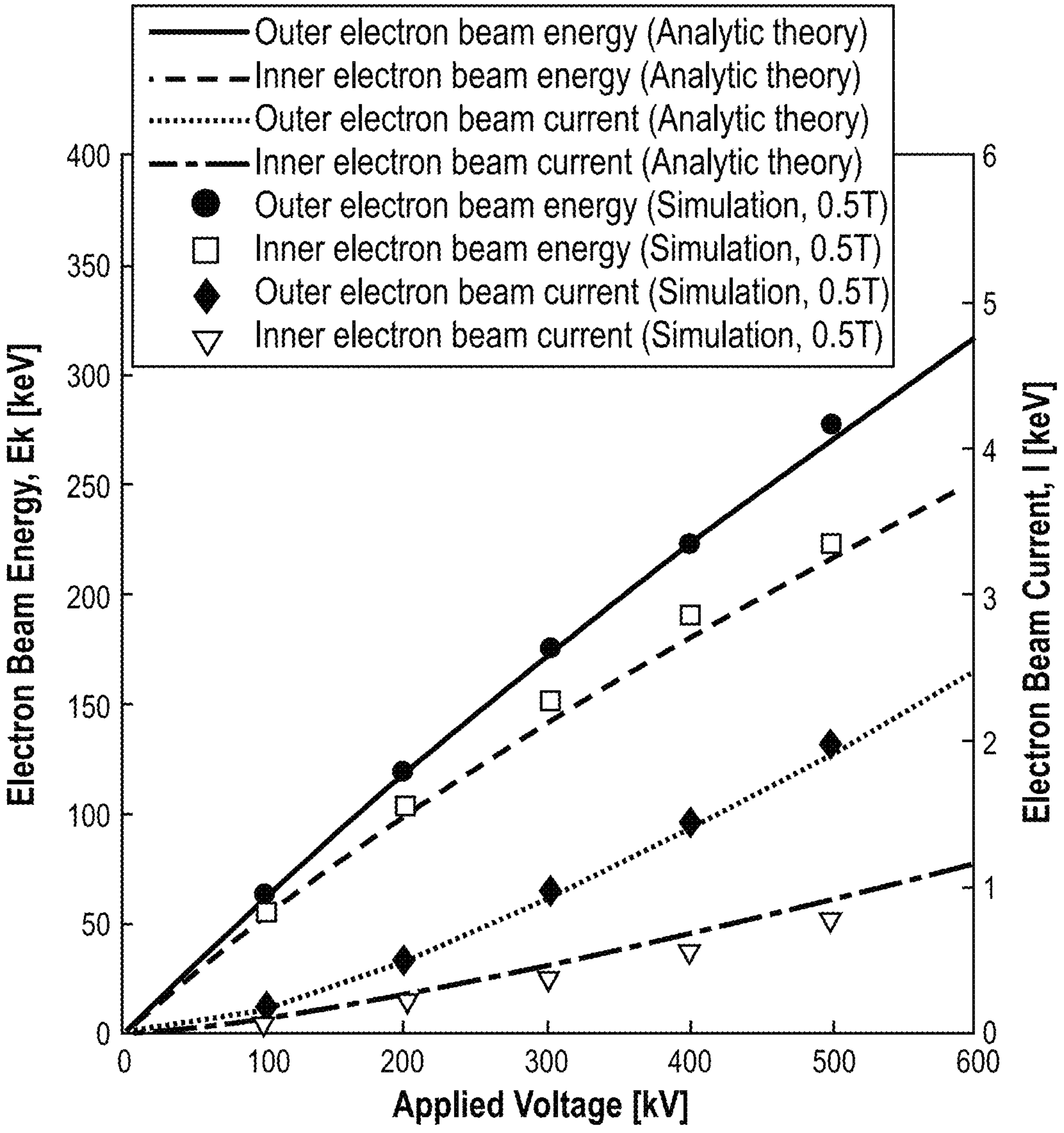

FIGS. 9A and 9B show plots depicting the analytically calculated and MAGIC PIC simulated 'inner' and 'outer' electron beam current and energy as a function of applied voltages for $\vec{B}$=0.5 T and $$r_{ib} = \frac{1}{4} r_{ob}$$

(FIG. 9A), and $\vec{B}$=0.5 T and $$r_{ib} = \frac{1}{2} r_{ob}$$

(FIG. 9B), in accordance with the present disclosure.

Figure 10A:
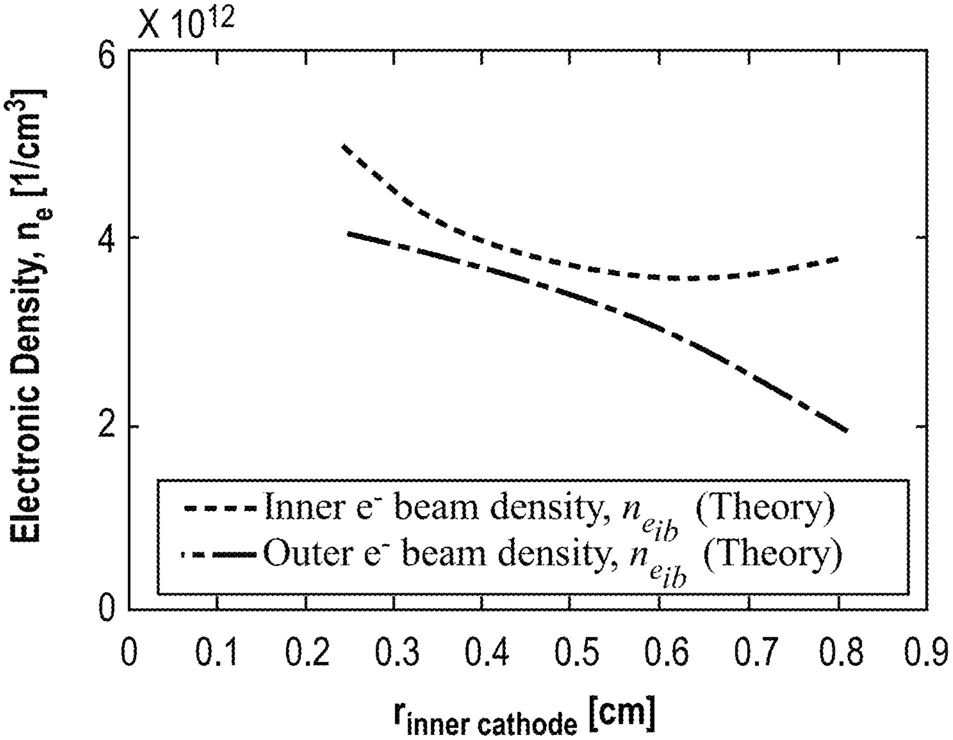

FIGS. 10A and 10 B show plots depicting the calculated 'inner' and 'outer' electron beam density (FIG. 10A), and 'inner' (dotted red) and 'outer' (blue dash) electron beam plasma frequency (FIG. for the applied potential of 400 kV as a function of the radius of the inner beam $r_{ib}$, in accordance with the present disclosure.

Figure 11:
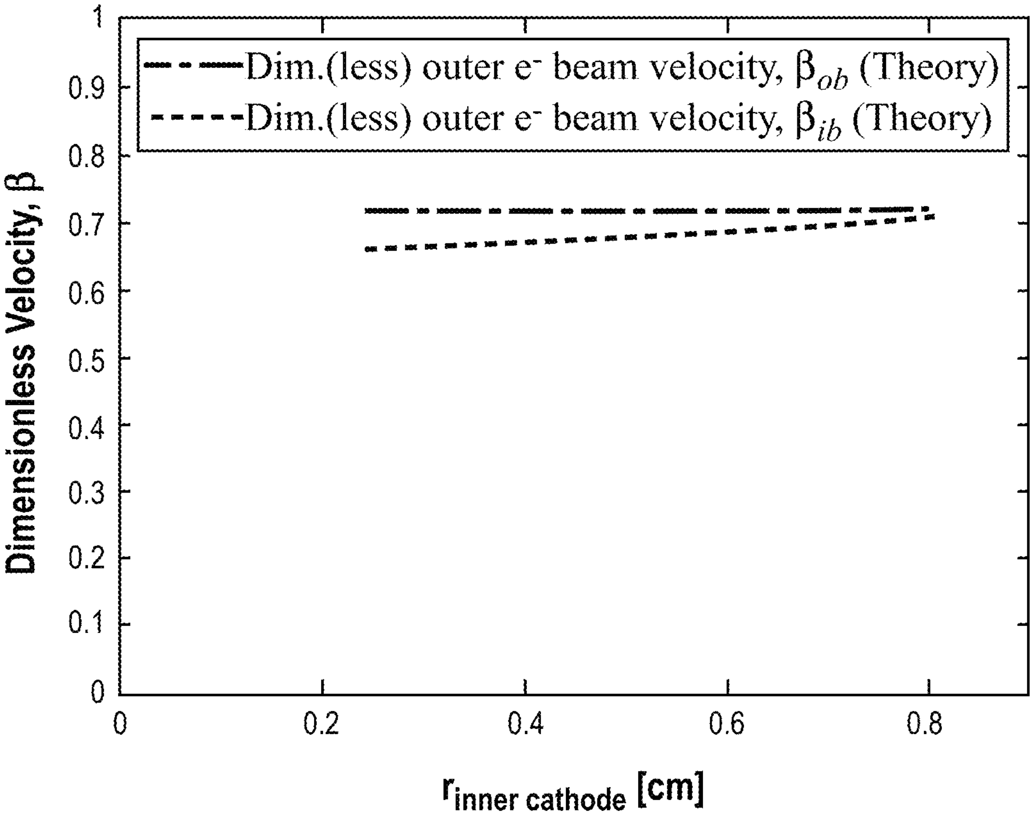

FIG. 11 is a plot depicting a calculated dimensionless velocity β for the inner and outer electron beams as a function of $r_{ic}$ for an applied potential 400 kV, in accordance with the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same or like parts.

Disclosed herein is a method and apparatus related to generating multi-stream electron beams with different energies and comparable currents from a single cathode stalk at a single potential using nested magnetically insulated coaxial diodes (MICDs). The application can be used as a multi-stream traveling wave tube (TWT). 1 Particle-in-cell (PIC) simulations are performed for an experimental parameter-based geometry where two thin-walled intense relativistic electron beams immersed in a strong uniform magnetic field propagate through a cylindrical vacuum channel. The analytically derived results are obtained by extending Fedosov's solution for generating a hollow electron beam from an MICD on a cathode stalk in an infinite magnetic field. Two electron beams are generated and accelerated downstream assuming zero initial kinetic energy of the electrons from the cathodes. Results show both electron beam currents ranging from 66 A-2.8 kA with an energy difference ranging from 6-27% depending on voltages applied from 100-1000 kV and the geometry of the two MICDs. An optimal geometry is a crucial factor in achieving the maximum energy difference between the electron beams for comparable currents. The analytical and numerical simulation results show good agreement. We are currently in the process of planning experiments using the electron beam accelerator (SINUS-6 at UNM) to validate the analytical and simulation results. Multi-stream electron beams have been shown to lead to super-amplification in TWTs.

Multi-stream electron beam generation has recently been of great interest in high-power microwave (HPM) sources, especially for a traveling wave tube (TWT) amplifier with a slow wave structure for efficiency enhancement. The present disclosure provides a traveling wave tube amplifier that uses two nested coaxial magnetically insulated coaxial diodes (MICDs) using The University of New Mexico's (UNM's) SINUS-6 Electron Beam Accelerator to generate two electron beams from a single-cathode stalk at a single potential with comparable currents. In contrast with traditional electron beam accelerators available at the time, in the early 1970s, a number of accelerators were developed at the High-Current Electronics Institute (HCEI) of the Siberian Branch of the Russian Academy of Sciences under the leadership of Academician G. A. Mesyats in 1977 and given the name SINUS, which is a Russian acronym for a high-current accelerator. The goal of the HCEI was to perform experimental investigations, as well as to have practical applications of these experimental devices. The very first high-current (30 kA) intense electron beam accelerator was introduced by Graybill in the late 1960's. Subsequently, in different laboratories in the USA, research on pulsed, high-current electron beam accelerators grew with electron beam parameters continually increasing. Over 30,000 accelerators (including conventional ones) are currently in use worldwide. The majority of these devices are used for healthcare and in industrial applications. Pulsed power-driven electron beam accelerators, on the other hand, find their use primarily in areas such as radiography and HPM generation. The NAGIRA radar was based on a SINUS-class pulsed power-driven backward wave oscillator (BWO). These high-current accelerators are capable of operating at high repetition rates through the use of their Tesla transformer technology. It was found that, by using a Tesla transformer with a pulse forming line, it is possible to generate pulse-periodic nanosecond electron beam accelerators of 1-5000-J stored energy and electron energy of 0.2-2 MeV with 4-40 ns pulse duration and an average beam power>100 kW. There has been some work published in the past that uses conventional vacuum electron beam device (CVED) concepts to generate multiple electron beams for applications to TWTs. These works, however, all utilize two cathodes driven independently by two separate power supplies, which is feasible at the low voltages that these works were considering. Additional work has been conducted in the context of generating multiple beams from a single pulsed power generator; however, these earlier works just describe a technique to decrease the current in an electron beam generated from a low-impedance driver. They use two nested cathodes to generate two electron beams, but they intercepted one of the beams and used the lower current second beam for their application. This work does not describe using two beams with 10%-20% energy differences and comparable currents for a high-power TWT that are of interest. Although some research has been carried out on high-power TWTs and high-power multi-stream technologies, no single study exists, which describes a multiple electron beam TWT amplifier powered by two cathodes on a single-cathode stalk at a single potential with 10%-20% energy differences and comparable currents.

Previous knowledge of two-beam high-power amplifiers is primarily based on very limited publications on the subject. The present teachings aim to broaden the present understanding of this field and develop a model of a device capable of generating two electron beams with 10%-20% energy difference from a single high-power cathode stalk, which can be used in any HPM device. The initial goal was to develop an analytic theory by reviewing an existing MICD theory for a single beam formulated by Fedosov et al., which calculates the electron beam current and electron beam potential at the electron boundary of an MICD. The existing MICD theory develops the I-V characteristics of an MICD for an axially applied infinite magnetic field and extended later by Belomyttsev et al. for an axially applied finite magnetic field. Intense electron beam formation in a vacuum drift tube is a complicated process due to the strong space-charge and self-magnetic field of nanosecond pulsed duration beam, and intensive study on this field is still ongoing. The space-charge-limited (SCL) current is one of the most important phenomena in charged particle beams, especially in the relativistic case. An analytic theory for the SCL for a relativistic electron beam was developed in the 1970s. A recent study on partial SCL current on edge-type MICD by Belomyttsev develops a mathematical basis that agrees with Fedosov's theory and experimental results for an MICD. The present teachings focus on the modeling and simulation of how to generate two electron beams with 10%-20% energy differences and comparable currents from a single-cathode stalk at a single potential. Generating multiple beams with different energies and comparable currents from a single power supply will bring a breakthrough among the high power microwave (HPM) community. A foremost goal in the present teachings is to provide a design for a nested cathode with a given potential of at least up to 400-600 kV that can generate 10%-20% energy differences and comparable currents of about 2-3 kA from a single-cathode stalk at a single potential. The present teachings provide a design of two nested MICD and the significance of the single-cathode stalk potential that is applied to two nested MICDs. Further explanation of the particle-in-cell (PIC) simulation process by parameters used in experiment and a discussion of the results obtained from the simulation are provided in the present disclosure.

A linear theory known in the art, where amplification in a traveling wave tube (TWT) can be enhanced if it is driven by two or more electron beams with comparable currents and 10%-20% energy difference. For multiple-stream electron beam generation in high-power microwave (HPM) sources, particularly TWTs, one challenge is how to generate multiple beams with different energies and comparable currents from a single cathode stalk at a single potential driven by a pulsed power generator.

Previous work has used multiple cathode sources to produce multiple electron beams in low power microwave sources where each cathode is powered using a separate power supply at different voltages. However, for HPM generation using a pulsed power generator, it is not practical to use separate power supplies to individually power separate cathodes. Therefore, there is a need to identify a technique to generate multiple electron beams with different energies and comparable currents from a single cathode stalk at a single potential. One goal is to provide a 10%-20% difference in energies from the two beams with comparable currents.

While the concept of a two-beam amplifier has been proposed, previous designs were for low voltages and used separate supplies to power two cathodes. Additional concepts have been explored where actual designs of two-beam devices are shown, but these also used relatively low voltages and two electron guns and, thus, it is easy to implement using two separate power supplies. Recent publications also describe how the two-stream instability using counter streaming electron beams can be used for THz generation. Furthermore, other recent work describes a two-electron-gun-powered TWT, but at relatively low voltages. Additional earlier work describes a technique to decrease the current in an electron beam generated from a low impedance driver. This concept uses two nested cathodes to generate two electron beams, but one of the beams is intercepted and the lower current second beam is used in this application. The difference in currents between the inner and outer beams are calculated but the self-consistent energies in the two beams are not considered. By contrast, herein is provided a method and design that self-consistently calculates the currents from, and energies of, two electron beams generated from two nested magnetically insulated coaxial diodes (MICDs) for a high-power TWT. Although high-power technologies have been researched, none include a multi-beam TWT amplifier powered by two cathodes on a single cathode stalk at a single potential with 10-20% energy difference and comparable currents.

An additional challenge in designing an HPM multi-stream TWT amplifier is generating two or more electron beams with different energies and with comparable currents from a single cathode at a single potential driven by a pulsed power generator. The present teachings describe a two-electron beam device with different energies and comparable currents that is generated from a single cathode stalk at a single potential. A theory for generating two beams with 10%-20% energy difference and comparable currents for use in a two-beam TWT amplifier is provided as well as a validation of the theory and simulations experimentally. The relationship between the current-voltage and energy-voltage characteristics of intense multiple electron beams transported in a vacuum channel is also provided. Understanding the link between the electron beam current and electron beam energy enables further guidance of planned experiments with multiple electron beam generation. In-depth analyses of analytical theory and particle-in-cell (PIC) simulations based on parameters relevant to experimental work are also described herein. This analytical and simulation work provides new insights into high-power dual-beam technology.

The Magnetically Insulated Coaxial Diode (MICD)

Figure 1:
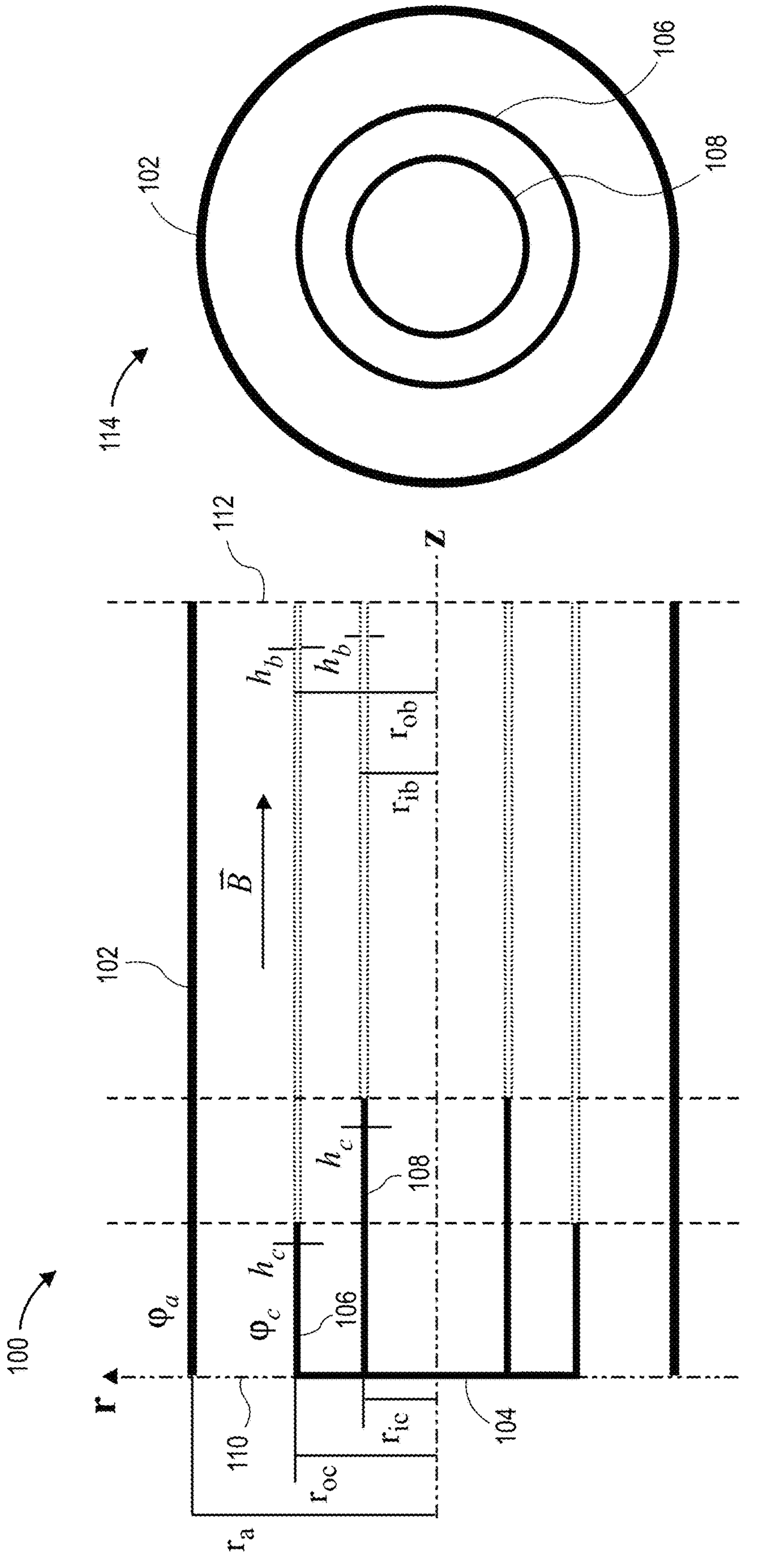
FIG. 1 is a schematic of two nested magnetically insulated coaxial diodes (MCIDs) in a vacuum tube, in accordance with the present disclosure.

FIG. 1 is a schematic of two nested magnetically insulated coaxial diodes (MCIDs) in a vacuum tube, in accordance with the present disclosure. MICDs (magnetically insulated coaxial diodes) are widely used to generate high-current beams in pulsed power-driven electron accelerators. The geometry setup shown in FIG. 1 includes a schematic of an MICD 100 which is shown within a vacuum tube 102. The MICD 100 includes an anode 104, a single cathode stalk 106, an outer emitter, or cathode 108, an input port 110, and an output port 112. These features are also shown in a cross-sectional view 114 of the MICD 100 structure. The parameters associated with this schematic are listed in Table 1. The stalk has two annular emitters (i.e., outer and inner emitters). The outer emitter is defined by a fixed position of ($r_{oc}$, $z_{oc}$) and the inner emitter is defined as a function $f$ ($r_{ic}$), where $r_{ic}$ is the outer radius of the inner cathode. The thickness of both cathodes is $h_c$=0.02 cm, and a uniform infinite axial magnetic field is parallel to the axis of the electron beams. It is important to emphasize that only a single potential is applied to the single cathode stalk with two annular emitters. Theoretically, in the calculation of Fedosov et al., the anode's potential is assumed positive (+$\phi_a$) and the cathode's potential is $\phi_c$=0. A potential difference of V is applied to the gap of the cathode and anode, where the cathode is separated by a distance $r_a$-$r_c$ from the anode. Consider a very thin annular beam whose thickness must be much smaller than both the beam radius $r_b$ and the gap from the beam to the anode's wall. The electron beam propagates through the cylindrical symmetric drift tube and an infinite uniform magnetic field is applied longitudinally to the beam axis. Since the motion of the electron in the acceleration region is not considered, in this case, the electron beam motion is one-dimensional (1D).

Numerical Modeling

The schematic for the simulation model is shown in FIG. 1. The design parameters are based on the SINUS-6 for the simulation model and are listed in Table 1, below.

TABLE 1

Design parameters of two nested MICDs in a vacuum tube

| Design Parameters | Symbols | Values | Units | Outputs Parameters | Units |
|---|---|---|---|---|---|
| Anode potential | $\varphi_a$ | 100-500 | kV | $I_{ib}$ | A |
| Cathode potential | $\varphi_c$ | 0 | kV | $I_{ob}$ | A |
| Anode radius | $r_a$ | 2.5 | cm | $\gamma_{ib}$ | Unitless |
| Anode length | $z_1$ to $z_3$ | 16.5 | cm | $\gamma_{ob}$ | Unitless |
| Outer cathode radius | $r_{oc}$ | 0.9 | cm | $Ek_{ib}$ | keV |
| Outer cathode length | $z_1$ to $z_0$ | 4.9 | cm | $Ek_{ob}$ | keV |
| Cathode thickness | $h_c$ | 0.02 | cm | | |
| Inner cathode radius | $r_{ic}$ | $r_{ic} < r_{oc}$ | cm | | |
| Inner cathode length | $z_1$ to $z_2$ | $l_{ic} < l_{oc}$ | cm | | |

Where: $I_{ib}$ is the inner electron beam current, $I_{ob}$ is the outer electron beam current, $\gamma_{ib}$ is the relativistic factor at the external boundary of the inner electron beam, $\gamma_{ob}$ is the relativistic factor at the external boundary of the outer electron beam, $Ek_{ib}$ is the inner electron beam energy, and $Ek_{ob}$ is the outer electron beam energy.

Prior to studying multiple electron beam generation, analytical calculations and PIC simulations were performed for a single MICD and the results are consistent between Fedosov's theory and the numerical simulations. Comparison of experimental measurements, PIC simulations, and analytical calculations shows good agreement between them. The simulation model and analysis were based on the SINUS-6 pulsed power electron beam accelerator at the University of New Mexico (UNM). The multiple electron beam-producing structure consists of two nested MICDs, where two thin annular cathodes are connected to a single cathode stalk at a single potential in vacuum.

A case study approach was followed to identify an optimal geometry from this nested MICD model. There are three main designs used to find the optimal geometry based on the axial and radial variations of the inner cathode position with respect to the outer cathode. The first case is where the anode dimension and the radial and axial position (r, z) of the outer cathode are fixed based on the parameters used on the SINUS-6 electron beam accelerator. To begin with, the inner cathode radius is selected to be halfway between the axis at r=0 and the fixed outer radius of the cathode. Initially, simulations were performed with the axial position of the inner cathode identical to the axial position of the outer cathode. Then, the axial position of the inner cathode was scanned by increasing it by a distance d beyond the axial position of the outer cathode. In the second case, a similar procedure was followed by sweeping the radius of the inner cathode by ¼ and ¾ of the radius of the outer cathode and scanning axially with respect to the outer cathode. The goal was to assess the trends and to identify the optimal position from these cases where comparable currents or minimum difference in current but maximum separation of energy can be achieved with more than 10% energy difference between the two electron beams being the goal. One notable result from this series of simulations is that the two electron beam currents are comparable at a particular radial position of the inner cathode for fixed outer cathode position and the maximum energy difference of about 10% is achieved at that particular point as well. It can be shown that this radial position of the inner cathode is precisely what was found in the analytical theory as well.

The analytical calculation was derived by extending the conceptual framework proposed by Fedosov et al. for a single MICD to two MICDs. Fedosov's theory is a well-known theory that calculates the current and energy at the boundary of an intense thin electron beam for $\vec{B}$=1 T transported in a vacuum channel. The theory was extended later by Belomyttsev et al. for the application of finite magnetic field, and the estimation of external finite $\vec{B}$ field also validates the approximation of $\vec{B}$=1 T. As in the simulation model, the same geometry of two nested MICDs connected to a single cathode stalk at a single potential are followed to perform the analytical derivation. A notable finding is the analytical theory and simulation results for multiple beam generation match one another. In both cases, there is about a 6%-27% energy difference between the inner and outer electron beam for an applied voltage ranging from 100 to 600 kV and for different inner cathode radial positions. In examples, the voltage can be increased as high as 1000 kV.

A possible explanation for why two nested MICDs mounted on a single cathode stalk at a single potential generate two electron beams with different energies and comparable currents is that the electron beam space charge from the outer cathode screens the inner electron beam emitted from the inner cathode, thereby reducing the energy of the inner electron beam. To verify this, the opposite configuration was tested, where the inner cathode no longer extends beyond the axial position of the outer cathode. In this case, it can be observed that the current from the inner electron beam reduces to zero and the current from the outer electron beam increases to the Fedosov current from a single MICD.

Figure 2A:
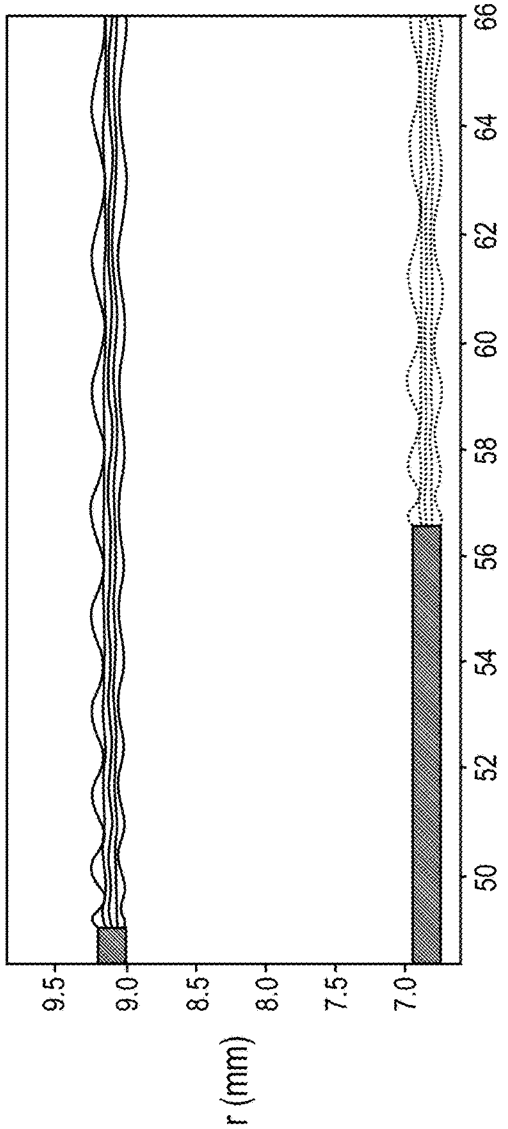
FIGS. 2A and 2B depict a MAGIC model (FIG. 2A) showing macroparticles emitted from the inner and the outer cathodes and a static electric field contour plot (FIG. 2B) illustrating the accelerating field, in accordance with the present disclosure.
Figure 2B:
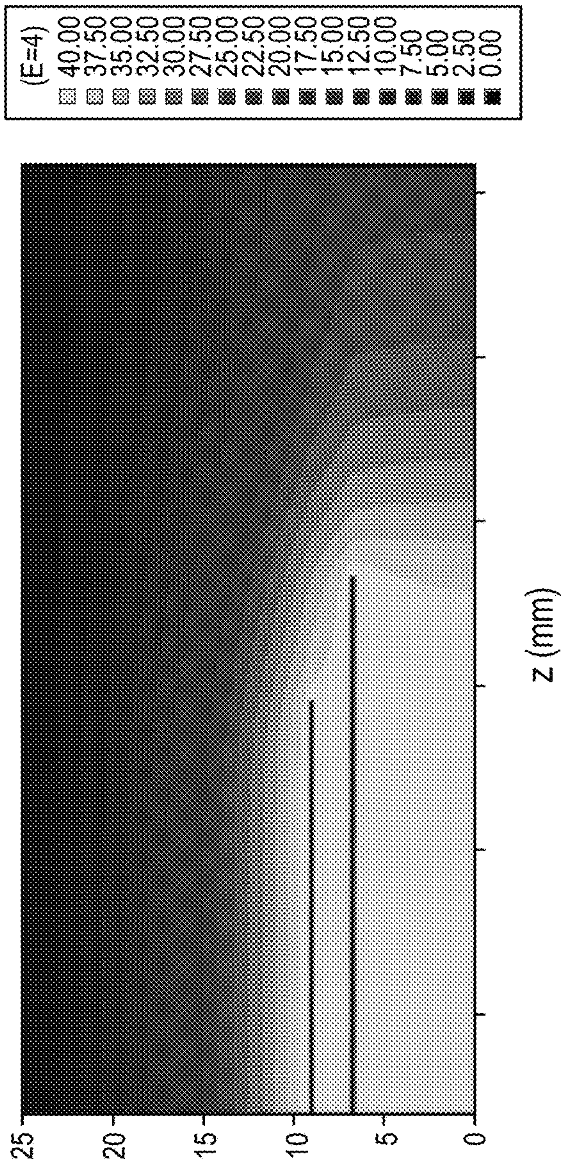
Figure 3A:
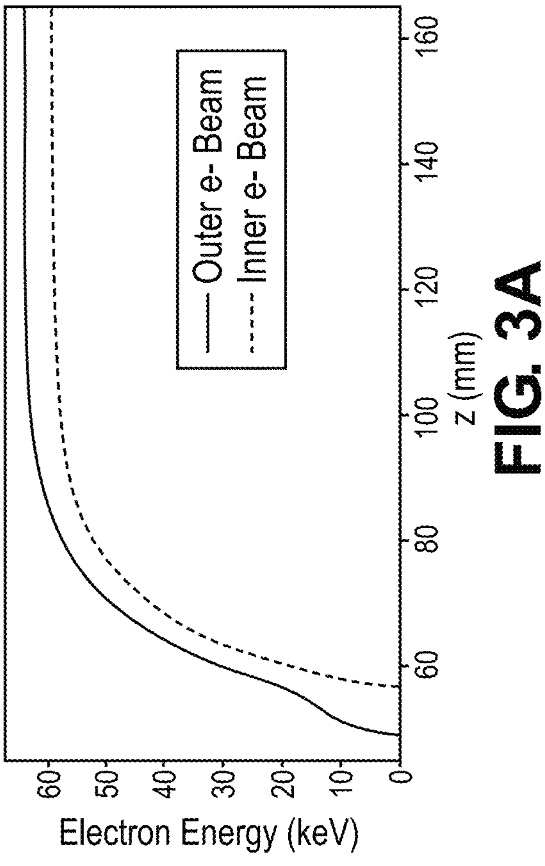
FIGS. 3A-3D depict plots showing the obtained simulated phase space plot of energy of the "inner" electron beam and "outer" electron beam for applied voltages ranging from 100 to 400 kV and a magnetic field of 3 T as a function of time, in accordance with the present disclosure.
Figure 3B:
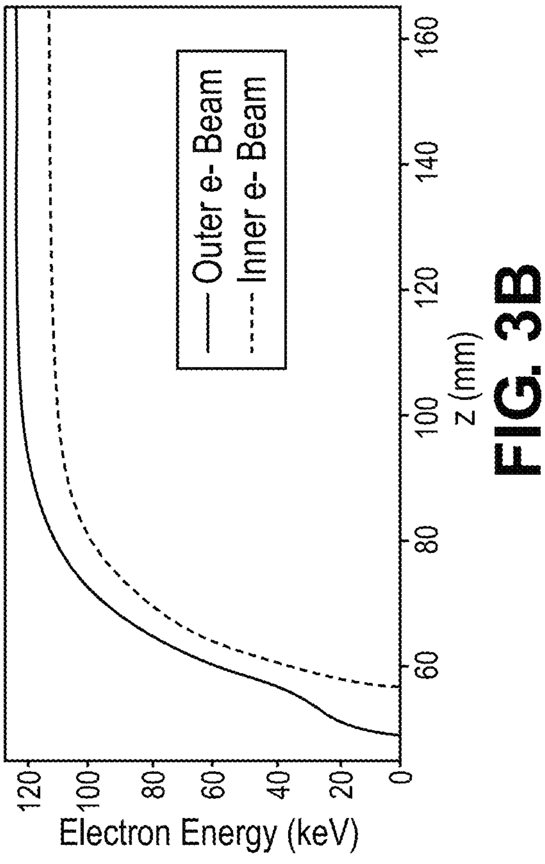
Figure 3C:
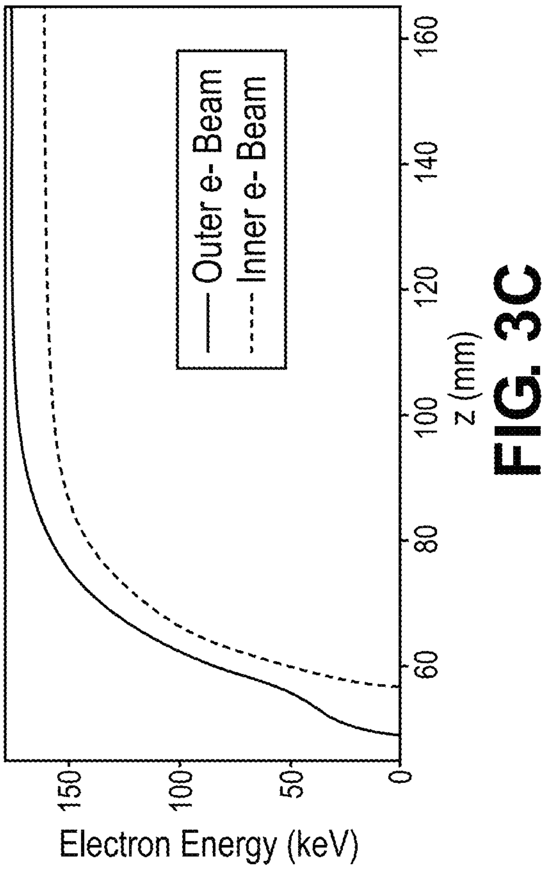
Figure 3D:
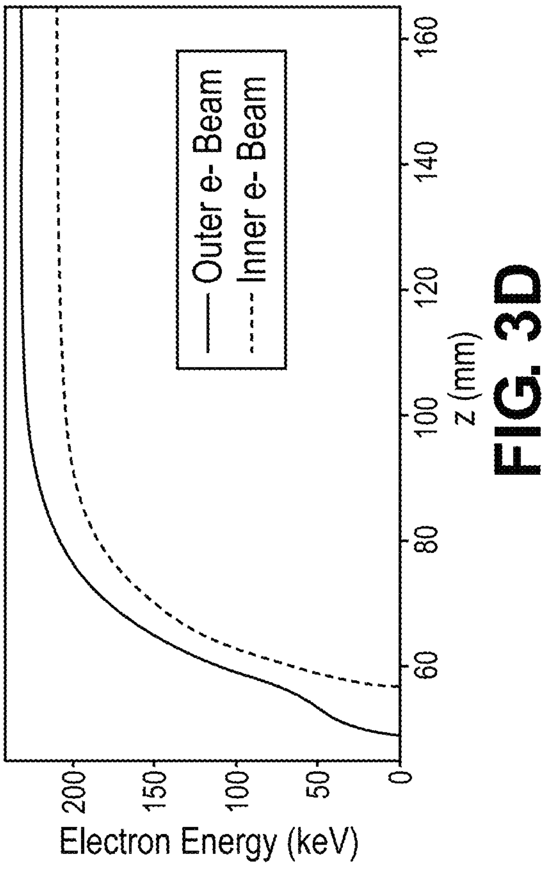

FIGS. 2A and 2B depict a MAGIC model (FIG. 2A) showing macroparticles emitted from the inner and the outer cathodes and a static electric field contour plot (FIG. 2B) illustrating the accelerating field, in accordance with the present disclosure. FIGS. 3A-3D depict plots showing the obtained simulated phase space plot of energy of the "inner" electron beam and "outer" electron beam for applied voltages ranging from 100 to 400 kV and a magnetic field of 3T as a function of time, in accordance with the present disclosure. The numerical simulations are conducted in two phases—2D axisymmetric MAGIC simulations for rapid scoping and more comprehensive 3D MAGIC simulations. Actual experimental parameters from the SINUS-6 electron beam accelerator at UNM are used in both 2D and 3D PIC simulations to study the electron beam transport [cf. FIG. 2A shows macroparticle] through the vacuum channel and the final beam energies and currents. Static electric field contour plots illustrate the accelerating field can be seen in FIG. 2B. FIGS. 3A-3D show the obtained simulated phase space plot of energy of the "inner" electron beam (red) and "outer" electron beam (blue) for applied voltages ranging from 100 to 400 kV and a magnetic field of 3T as a function of time. It should be noted that in examples, the applied voltage used can be as high as 1000 kV.

Analytical Derivation

FIG. 1 shows the geometry of the set-up in the r-z plane of two nested MICDs as labeled. The design parameters of MICDs are listed in Table 1. An approach to Fedosov's is used for the mathematical derivation for a single MICD. Consider two very thin annular beams with radius $r_{ib}$ ('inner'), $r_{ob}$ ('outer') and a cylindrical anode (conductor) with a radius $r_a$ are immersed in a B=∞ field. The thickness of the beams $h_{ib}=h_{ob}=h_b$ must be considerably smaller than both the beam radius $r_{ob}$ and the gap between $r_a$ and $r_{oc}$. Theoretically, the potential at the cathode's surface is taken as zero and the potential of the cylindrical surface as $\phi_a$. Therefore, the potential difference between the surface of the anode and the surface of the cathode surface will be $\Delta\phi$ as shown in FIG. 1. Both electron beams are injected with the same potential which is propagated through the cylindrical symmetric drift tube. It is assumed that an electron leaves the outer emitter with an initial velocity $v_{z_{ob}}$, mass $m_e$, and charge density $j_{z_{ob}}=-en_{e_{ob}}v_{z_{ob}}$. Similarly, an electron leaves the inner cathode with an initial velocity $v_{z_{ib}}$, mass m e and charge density $j_{z_{ib}}=-en_{e_{ib}}v_{z_{ib}}$ where $j_{z_{ob}}$ & $j_{z_{ib}}$ are the constant current densities of the outer and inner beams respectively. The assumption for the two nested MICDs is that the inner emitter axial position extends beyond that of the outer emitter axial position by a distance d. By assuming very thin annular beams and a uniform infinite axial magnetic field $\vec{B}$, three boundary conditions are invoked to derive the system of equations (SOE): at the anode, $\gamma=\gamma_a$=constant for a given positive potential $\phi_a$ applied to the anode with respect to the cathode where $$\gamma_a = 1 + \frac{e_0\phi_a}{m_0c^2}. \tag{1}$$

Here, $e_0$, $m_0$ are the electron charge and mass respectively and c is the speed of light. Second, at the cathode's surface, $\gamma$=1, meaning that the electrons leaving the cathode's surface have zero initial kinetic energy. For the cathode potential, it is assumed that $\phi_c=\phi_{cath}=0$. It should be noted that in the experiments the anode is grounded, and the cathode is at negative high voltage. The decision to have the anode be at a large positive potential with respect to the cathode is to be consistent with the original Fedosov derivation.

Since the inner emitter extends axially beyond the outer emitter, it is found that the relativistic factor $\gamma_h$ in region $z_2$ as shown is FIG. 1, where $\gamma=\gamma_h$=constant for a given positive potential to the anode and a geometrical factor $$g = \frac{\ln\left(\frac{r_{ob}}{r_{ib}}\right)}{\ln\left(\frac{r_a}{r_{ib}}\right)}.$$

Solving for $\gamma_h$ is completed by integrating over the volume between radii $r_{oc}$ and $r_a$ and cross-sections $z_1$ and $z_2$, and applying conservation of momentum in the z direction for the system, where $\gamma_a$ and g are known:

$$\gamma_h = \frac{\sqrt{(8\gamma_a - 8)g + 9} - 1}{2}. \tag{2}$$

By considering the assumptions described above with the three boundary conditions, the SOE (3) and (4) is derived. These two equations provide the solutions for the relativistic factors $\gamma_{ib}$ and $\gamma_{ob}$ for the external boundary of the 'inner' and 'outer' beams, respectively:

$$((\gamma_{ib} - \gamma_a)g + (\gamma_{ob} - \gamma_{ib}))\sqrt{(\gamma_{ob} - 1)(\gamma_{ob} + 1)} - \gamma_{ob}C = 0, \tag{3}$$

$$(\gamma_a - 1)^2 - (\gamma_a - \gamma_{ob})^2 - (\gamma_{ob} - \gamma_{ib})^2\frac{1-g}{g} - 2\left[\frac{(\gamma_{ob}^2 - 1)}{\gamma_{ob}}\left(\frac{\gamma_a - \gamma_{ob}}{1-g} - \frac{\gamma_{ob} - \gamma_{ib}}{g}\right) + \frac{(\gamma_{ib}^2 - 1)}{\gamma_{ib}}\frac{(\gamma_{ob} - \gamma_{ib})}{g}\right](1-g) = 0. \tag{4}$$

By applying a potential difference across the outer beam—inner beam gap in the region $z=z_3$, an expression is derived for the current of the 'inner' electron beam (Eq. (5), where $\gamma_{ob}$ and $\gamma_{ib}$ are known from the solutions of the SOE. Similarly, by applying a potential difference across the outer beam—anode gap and a potential difference across the outer beam—inner beam gap in the region $z=z_3$, an expression is derived for the current of the 'outer' electron beam (Eq. (6), where $\gamma_{ob}$ and $\gamma_{ib}$ are known from the solutions of the SOE (3) and (4), given by $$I_{ib} = \frac{2\pi\epsilon_0 c^3}{\eta\ln\left(\frac{r_{ob}}{r_{ib}}\right)}\frac{(\gamma_{ob} - \gamma_{ib})\sqrt{\gamma_{ib}^2 - 1}}{\gamma_{ib}}, \tag{5}$$

and $$I_{ob} = \frac{2\pi\epsilon_0 c^3\left(\sqrt{\gamma_{ob}^2 - 1}\right)}{\eta\gamma_{ob}}\left[\frac{(\gamma_a - \gamma_{ob})}{\ln\left(\frac{r_a}{r_{ob}}\right)} - \frac{(\gamma_{ob} - \gamma_{ib})}{\ln\left(\frac{r_{ob}}{r_{ib}}\right)}\right], \tag{6}$$

where $r_a>r_{ob}>r_{ib}$ and $\gamma_a>\gamma_{ob}>\gamma_{ib}$ in both Eqs. (5) and (6). Here, $$\eta = \frac{e_0}{m_0},$$

c is the speed of light in vacuum, $r_a$ is the anode radius, $r_{ob}$ is the outer radius of the outer beam, and $r_{ib}$ is the outer radius of the inner beam. The electron kinetic energy can be determined from the well-known equations of energy for the inner and outer electron beams by using the solutions for $\gamma_{ob}$ and $\gamma_{ib}$ from the SOE's (3) and (4)

$$Ek_{ob} = (\gamma_{ob} - 1)m_0c^2 \tag{7}$$

$$Ek_{ib} = (\gamma_{ib} - 1)m_0c^2 \tag{8}$$

Results and Discussion

Figure 4C:
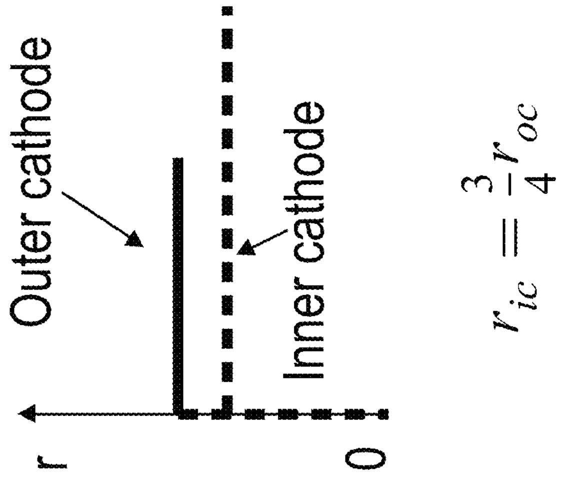
FIGS. 4A-4C are schematics showing the radial position of the inner cathode radius at ¼, ½, and ¾ of the outer cathode's radius, respectively, in accordance with the present disclosure.
Figure 4B:
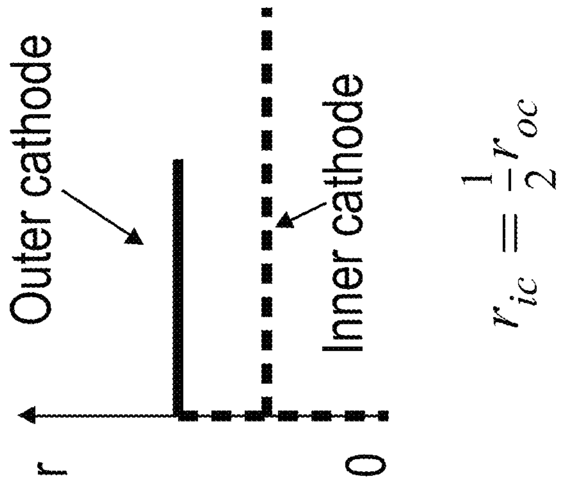
Figure 4A:
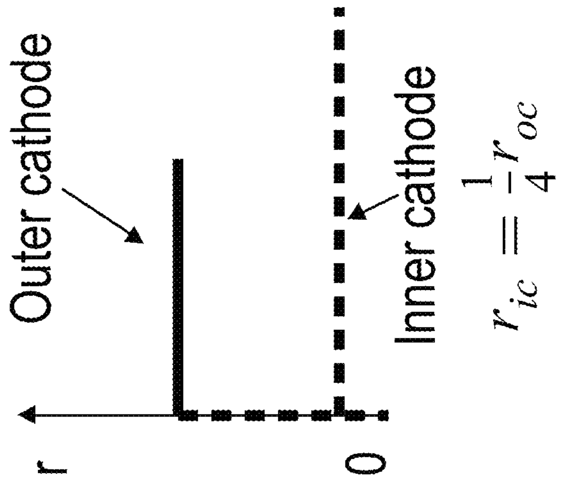

A comparison between analytical theory and PIC simulations is presented herein. The key parameter for multiple electron beam generation from MICDs is the radius of the inner emitter for a fixed outer emitter, as shown in the denominator of Eqs. (5) and (6). Therefore, a case study approach was followed as disclosed herein to identify the optimal geometry from this nested MICD model to achieve about 10% difference in energy between the two electron beams with comparable currents. FIGS. 4A-4C are schematics showing the radial position of the inner cathode radius at ¼, ½, and ¾ of the outer cathode's radius, respectively. There are three main cases used to find the optimal geometry, based on the axial and radial variations of the inner cathode with respect to the outer cathode.

The goal is to assess the trends and to identify the optimal position from these designs where comparable currents and maximum energy difference with greater than 10% being the goal can be achieved.

$$f(r_{ic}) = \begin{cases} r_{ic_1}r_{oc}, & r_{ic_1} = \frac{1}{4}, \quad 0 < r_{ic} < \frac{1}{2}r_{oc} \\ r_{ic_2}r_{oc}, & r_{ic_2} = \frac{1}{2}, \quad \frac{1}{2}r_{oc} \le r_{ic} < \frac{3}{4}r_{oc} \\ r_{ic_3}r_{oc}, & r_{ic_3} = \frac{3}{4}, \quad \frac{3}{4}r_{oc} \le r_{ic} < r_{oc}. \\ r_{ic_4}r_{oc}, & r_{ic_4} = \frac{3.5}{4}, \quad \frac{3.5}{4}r_{oc} \le r_{ic} < r_{oc}. \end{cases}$$

Therefore, in both the analytical calculations and the PIC simulations, a qualitative case study is followed (cf. FIG. 4) where only the inner cathode radius is varied with respect to the outer cathode's fixed radius. To maintain a qualitative approach, the behavior of both electron beams is observed based on the fractional positions of the inner beam's radius (i.e. ¼, ½, ¾ and 3.5/4 etc. with respect to the outer beam radius) as can be seen in Eq. (9).

In order to achieve two electron beams with comparable currents and maximum energy difference, it is found that an optimal position for the inner cathode's radius is ¾ of the outer cathode radius under the present conditions. In this case, similar currents can be achieved, $I_{ib}\approx I_{ob}$ ($I_{ib}$=1036.5 A and $I_{ob}$=1035 A) but more than 10% energy difference from both electron beams, while the inner beam radius is 0.69 cm and outer beam radius is 0.92 cm (cf. Table 2). It is also important to note that a series of MAGIC PIC simulations have been performed and the results are consistent between analytic predictions and the numerical simulation. It should be pointed out that while in the present disclosure, these conditions are considering two nested MICDs, but that this derivation can be extended to three or more nested MICDs.

Figure 5:
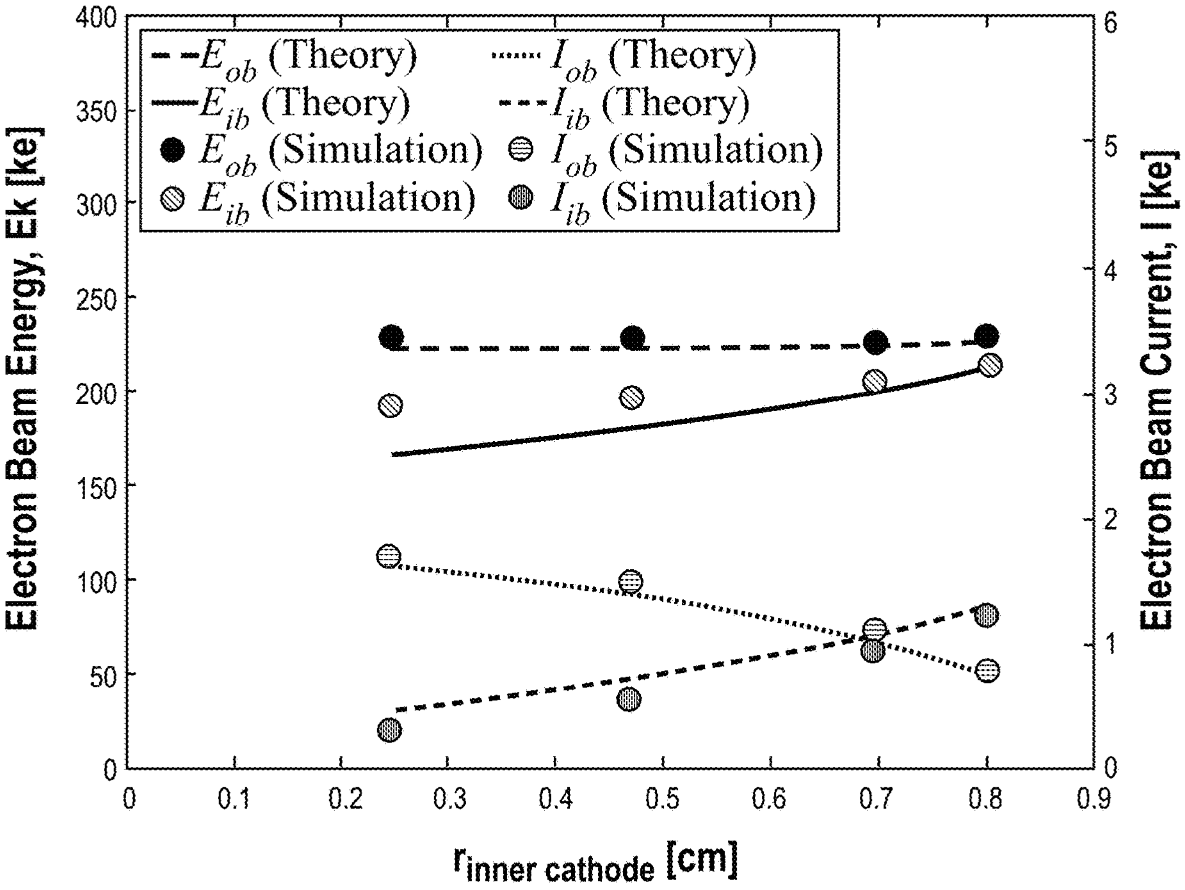
FIG. 5 is a plot depicting analytics and simulations of outer and inner electron beam currents and analytics and simulations of outer and inner electron beam energies as a function of the radius of the inner cathode $r_{ic}$, in accordance with the present disclosure.

FIG. 5 is a plot depicting analytics and simulations of outer and inner electron beam currents and analytics and simulations of outer and inner electron beam energies as a function of the radius of the inner cathode $r_{ic}$, in accordance with the present disclosure. The electron beam currents and kinetic energies on the same plot as a function of the 'inner' cathode's radius is shown in FIG. 5, where the inner cathode varies from 0.225 cm to 0.8 cm for an applied voltage of 400 kV. An interesting result is the two electron beam currents meet at the same point at 0.69 cm (viz., radial position of inner cathode) and a greater than 10% energy difference between two beams is achieved exactly at the same point (cf. in FIG. 5). Details data are presented in Table 2. For an applied voltage of 400 kV, $r_{ic}$=0.69 cm, and $r_{oc}$=0.92 cm, the energy difference is about 11% (in theory) and about 9% (in simulations), but both electron beam currents are comparable ($I_{ib.cal}$=1036 A, $I_{ob.cal}$=1034 A, $I_{ib.sim}$=941 A, $I_{ob.sim}$=1095 A) from both theory and simulations. In this case (while, $$r_{ic} = \frac{3}{4} r_{oc} = 0.69 \text{ cm})$$

more man 10% energy difference and comparable currents can be achieved. Moreover, simulations also provide similar results as theory where about a 9% energy difference and about the same electron beam currents ($I_{ib.sim}$=941 A, $I_{ob.sim}$=1095 A) are obtained. In addition, for other cases (while the inner cathode's radii are $$r_{ic} = \frac{1}{4} r_{oc} = 0.24 \text{ cm and } r_{ic} = \frac{1}{2} r_{oc} = 0.47 \text{ cm})$$

more than 10% energy difference can be achieved in both theory and simulations. PIC simulations, based on the actual parameters used in the SINUS-6 electron beam accelerator at the University of New Mexico (UNM), show that the outer beam space charge screens the space charge of the inner beam, and in that case, a comparable current 10% energy difference can be achieved when two beams are radially close to each other and axially inner beam in longer than the outer beam. The suitable ranges of cathode radii is this case $$r_{ic} = \frac{3}{4} r_{oc}$$

and the energy differenc is achieved at least 10%.

Figure 6A:
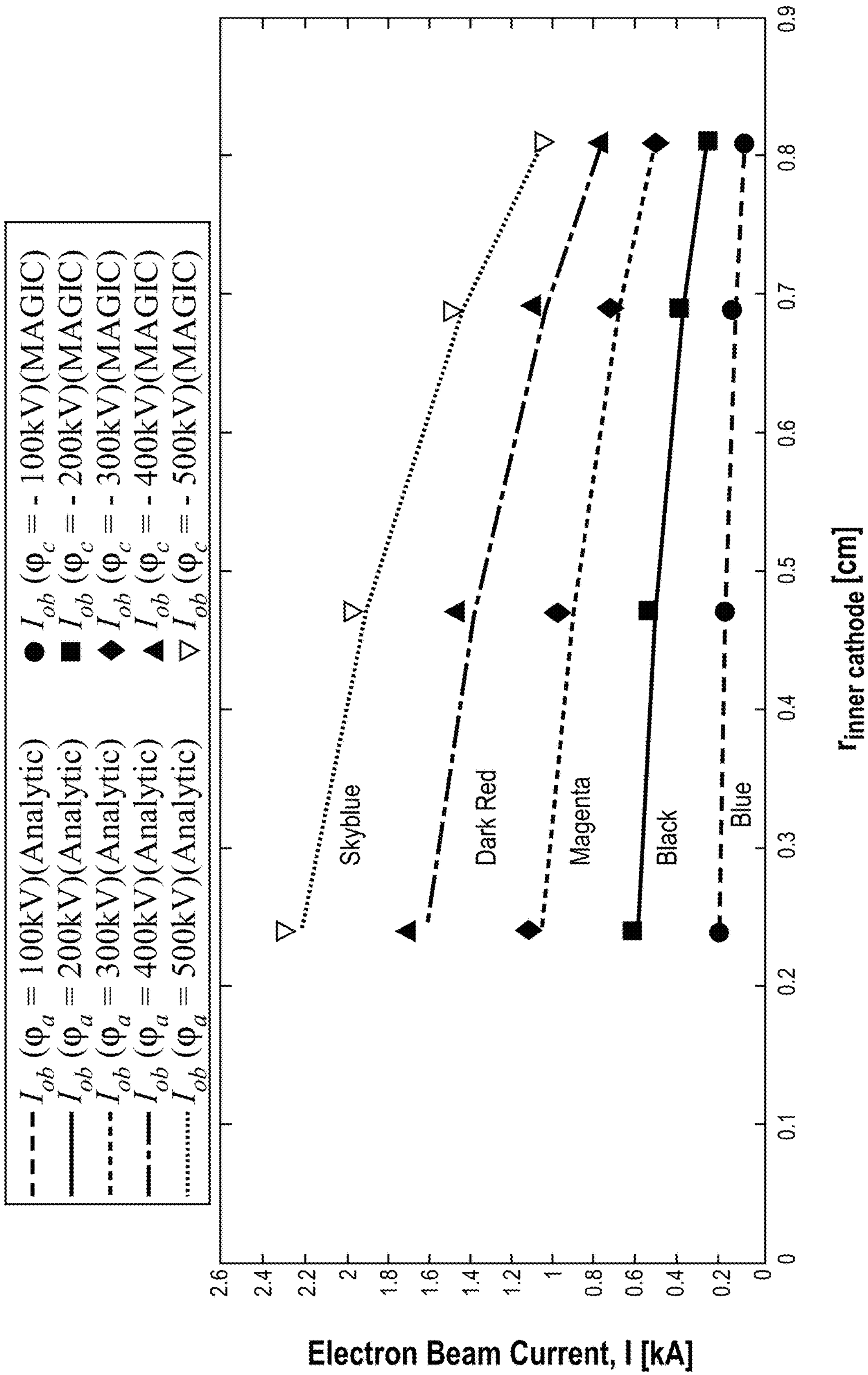
FIG. 6A and FIG. 6B are plots depicting data from analytically calculated and MAGIC PIC simulation of two nested MICDs as a function of the radius of the inner cathode $r_{ic}$.
Figure 6B:
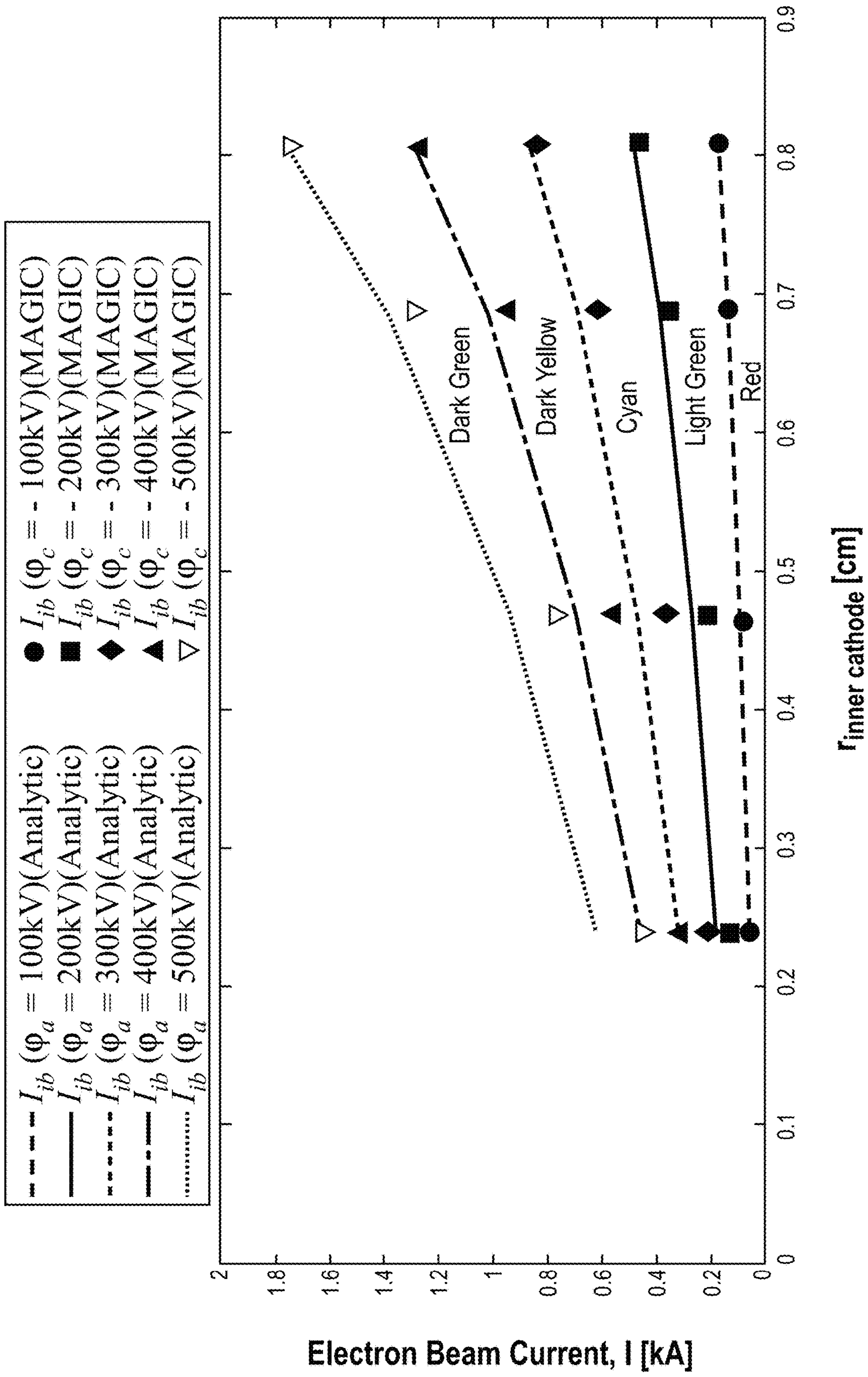

A comparison of theory and simulation results for 'outer' electron beam currents from two nested MICDs is shown in FIGS. 6A and 6B. FIG. 6A and FIG. 6B are plots depicting data from analytically calculated and MAGIC PIC simulation of two nested MICDs as a function of the radius of the inner cathode $r_{ic}$. FIG. 6A depicts the calculated 'outer' electron beam energy and the filled circles associated with corresponding MAGIC PIC simulated 'outer' electron beam energy, and FIG. 6B shows the calculated 'inner' electron beam energy associated with corresponding MAGIC PIC simulated 'inner' electron beam energy for different applied voltages ranging from 100-500 kV for a magnetic field of 3 T, with a total simulation time of 10 ns, in accordance with the present disclosure. There are five different colors representing five different applied voltages ranging from 100-500 kV and the solid lines with different colors show the calculated data and different markers with associated solid lines show simulated data obtained using the MAGIC PIC code in both FIGS. 6A and 6B. The x-axis shows the inner cathode's radial position from $r_{ic}$=0.24 cm to $r_{ic}$=0.81 cm (where, $r_{ic}$<$r_{oc}$=0.92 cm, with thickness of 0.02 cm), and the y-axis represents the beam current [kA]. As can be seen, the calculated and simulated 'outer' electron beam currents show excellent agreement for applied voltages ranging from 100-300 kV. Good agreement can be seen for applied voltages ranging from 400-500 kV as well. Similarly, in FIG. 6B, the calculated and simulated 'inner' electron beam currents show fairly good agreement for applied voltages of 100-200 kV. Good agreement can be seen for 300-500 kV as well. Both figures illustrate that, when the inner electron beam is farther away from the outer electron beam (i.e., at $r_{ic}$=0.225 cm), we observe that the outer electron beam current>inner electron beam current. As both electron beams get closer, the outer electron beam's space charge starts screening the inner electron beam. If both electron beams are very close to each other (i.e., $r_{ic}$=0.8 cm), we observe that the inner electron beam current>outer electron beam current.

TABLE 2

Calculated and simulated data of electron beam current and electron beam energy from each cathode for different cases for an applied voltage of 400 kV and a magnetic field of 3 T (in simulations).

| $\phi_a$ (kV) | $r_a$ [cm] | $r_{oc}$ [cm] | $r_{ic}$ [cm] | $h_c$ [cm] | $I_{ib.cal}$ [A] | $I_{ob.cal}$ [A] | $I_{ib.sim}$ [A] | $I_{ob.sim}$ [A] | $Ek_{ib.cal}$ [keV] | $Ek_{ob.cal}$ [ke V] | $Ek_{cal}$ Diff. % | $Ek_{ib.sim}$ [keV] | $Ek_{ob.sim}$ [keV] | $Ek_{sim}$ Diff. % |
|---|---|---|---|---|---|---|---|---|---|---|---|---|---|---|
| 400 | 2.5 | 0.9 | 0.225 | 0.02 | 466.9 | 1604 | 321 | 1703 | 167 | 223 | 25 | 189 | 225 | 16 |
| 400 | 2.5 | 0.9 | 0.45 | 0.02 | 703.5 | 1372 | 560 | 1470 | 181 | 223 | 19 | 193 | 225 | 14 |
| 400 | 2.5 | 0.9 | 0.675 | 0.02 | 1036 | 1034 | 941 | 1095 | 199 | 224 | 11 | 203 | 223 | 9 |
| 400 | 2.5 | 0.9 | 0.79 | 0.02 | 1301 | 760.7 | 1266 | 776 | 212 | 226 | 6 | 208 | 224 | 7 |

where $\phi_a$ is Applied voltage; $I_{ib.cal}$ is the inner electron beam current (Theory); $I_{ob.cal}$ is the outer electron beam current (Theory); $I_{ib.sim}$ is the inner electron beam current (Simulation); $I_{ob.sim}$ is the inner electron beam current (Simulation); $Ek_{cal}$ Diff. is the energy difference between inner ($Ek_{ib.cal}$) and outer ($Ek_{ob.cal}$) electron beam energy (Theory); and $Ek_{sim}$ Diff. is the energy difference between inner ($Ek_{ib.sim}$) and outer ($Ek_{ob.sim}$) electron beam energy (MAGIC simulation).

Figure 7A:
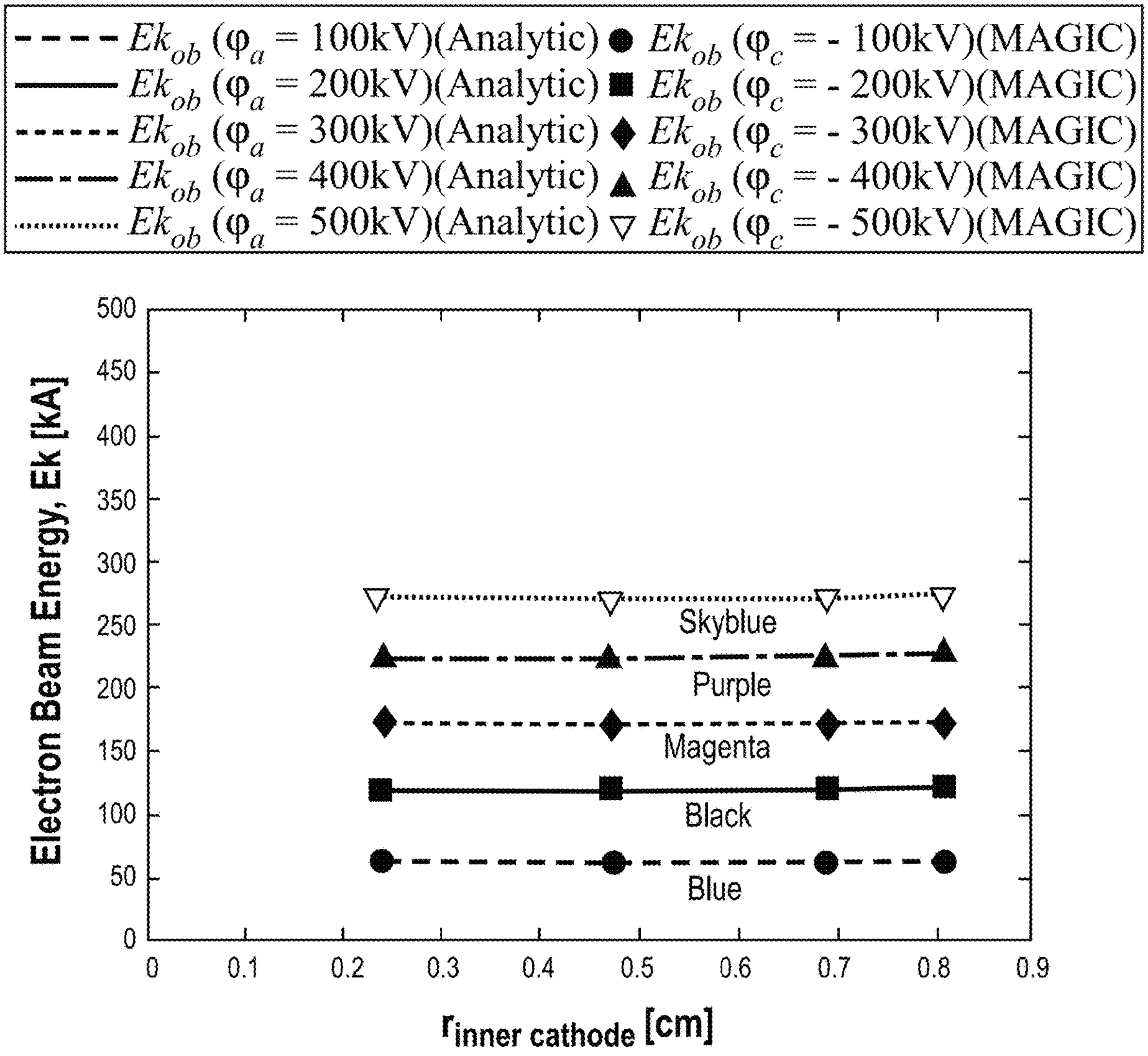
FIG. 7A and FIG. 7B are plots showing data from analytically calculated and MAGIC PIC simulation of two nested MICDs as a function of the radius of the inner cathode $r_{ic}$.
Figure 7B:
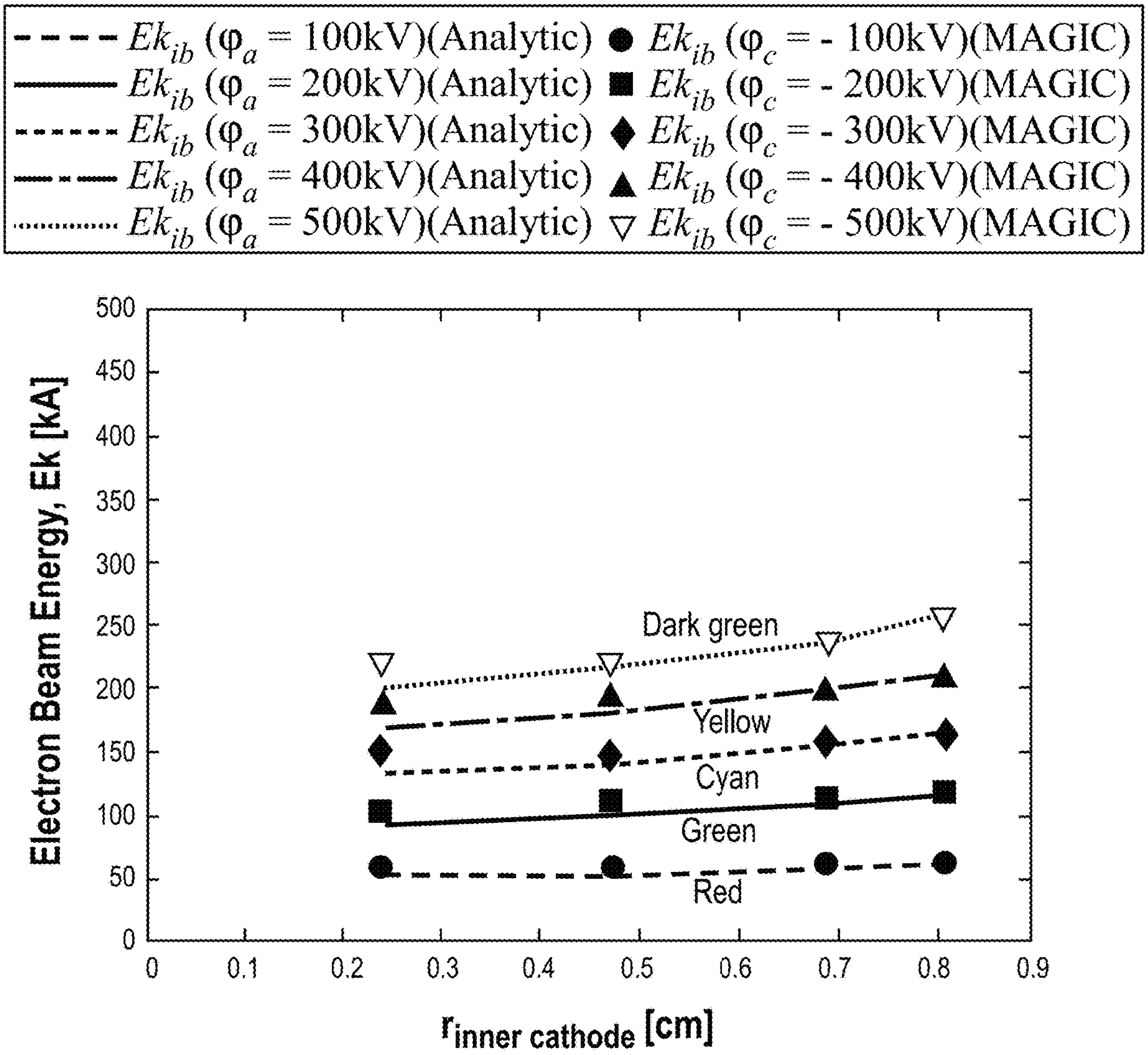

FIG. 7A and FIG. 7B are plots showing data from analytically calculated and MAGIC PIC simulation of two nested MICDs as a function of the radius of the inner cathode $r_{ic}$. FIG. 7A shows the calculated 'outer' electron beam energy and the associated corresponding MAGIC PIC simulated 'outer' electron beam energy, and FIG. 7B shows the calculated 'inner' electron beam energy and the associated corresponding MAGIC PIC simulated 'inner' electron beam energy for different applied voltages ranging from 100-500 kV for a magnetic field of 3 T, with a total simulation time of 10 ns, in accordance with the present disclosure. With a focus on the electron beam energy plots of FIGS. 7A and 7B, it can be observed that both theory and simulations for the case of outer electron beam energy show a close agreement for applied voltages ranging from 100-500 kV (cf. in FIG. 7A), but good agreement can be seen for inner electron beam at comparatively lower voltages (i.e., 100 kV and 200 kV) (cf. in FIG. 7B), but at higher applied voltages>200 kV, a slight difference between the analytics and simulated results can be seen for an inner beam as can be seen in Fig. FIG. 7B). Like FIGS. 6A and 6B, a liner relationship between the beam energies and radial gap of the two beams are observed. The energy difference is more than 15% for both theory and simulation case, when the radial gap between the two electron beams are larger. However, a decent energy difference of 9-11% is achieved at $r_{ic}$=0.69 cm with comparable currents as described previously.

Figure 8A:
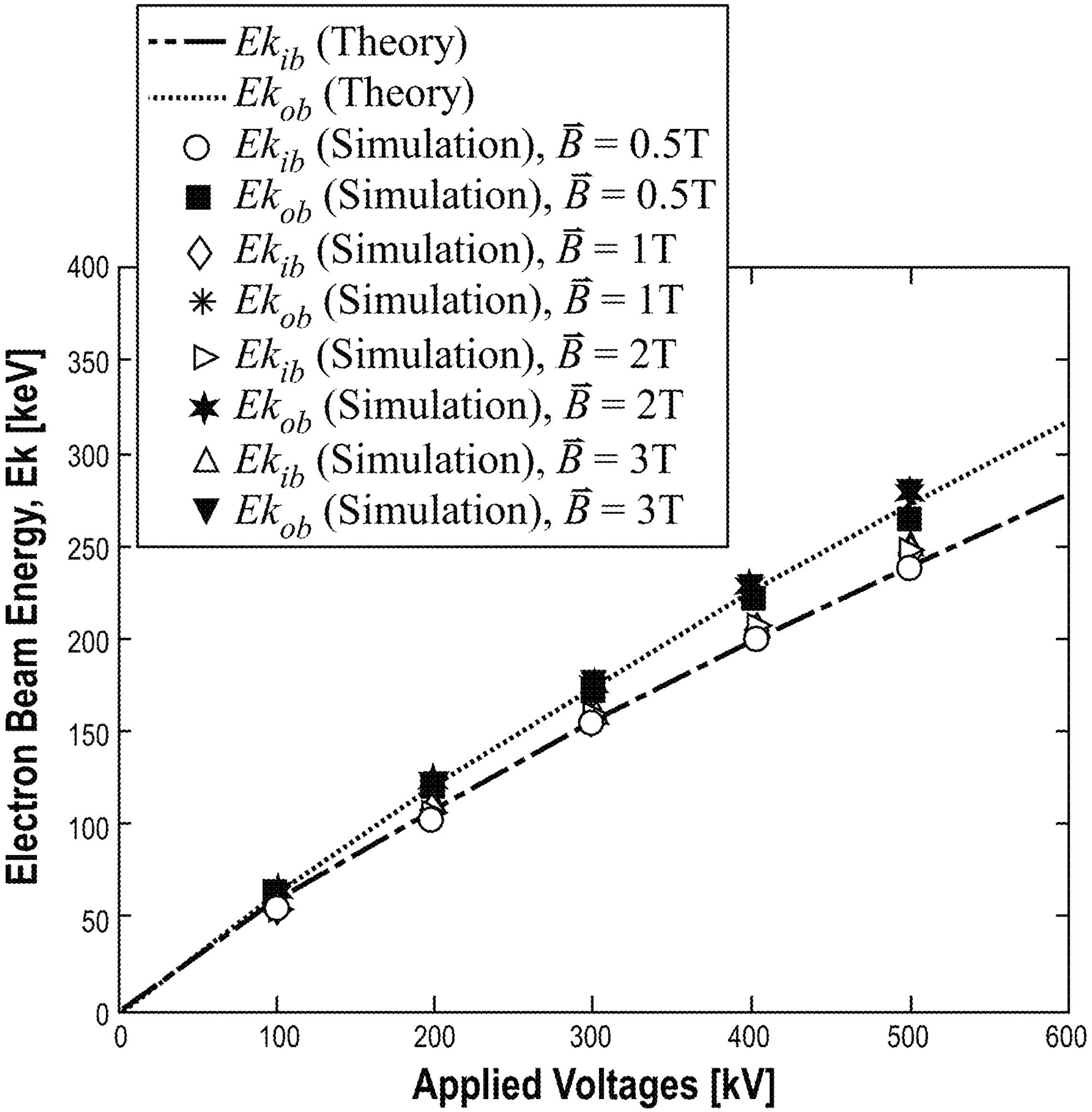
FIGS. 8A and 8B are plots showing the analytically calculated and MAGIC PIC simulated 'inner' and 'outer' electron beam energy (FIG. 8A), and electron beam current (FIG. 8B) for different applied voltages ranging from 0-600 kV and magnetic fields of $\vec{B}$=0.5,1,2,3 T, respectively, for a total simulation time of 10 ns. For both plots, the inner beam's radius is $$r_{ib} = \frac{3}{4} r_{ob},$$
Figure 8B:
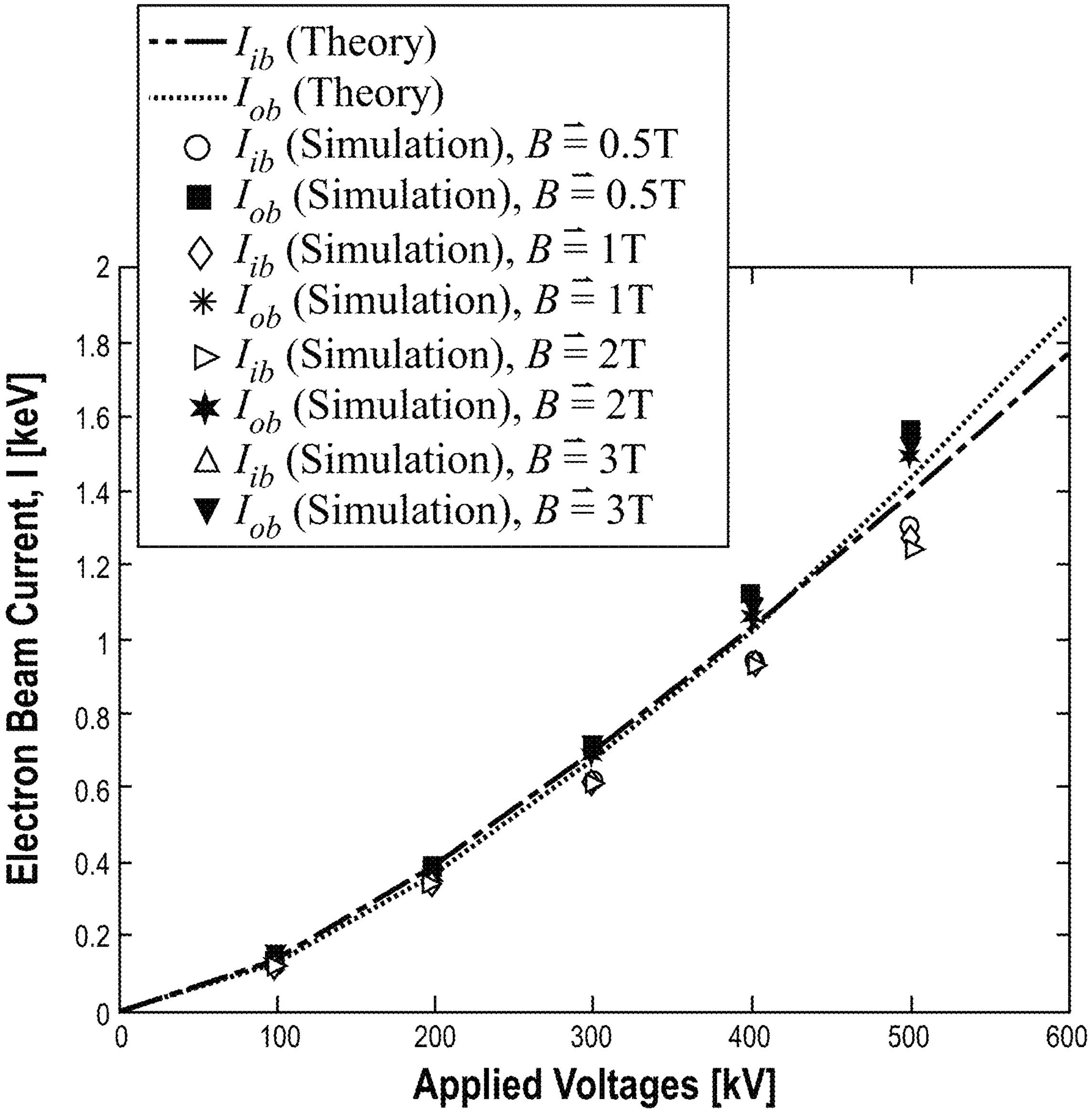

FIGS. 8A and 8B are plots showing the analytically calculated and MAGIC PIC simulated 'inner' and 'outer' electron beam energy (FIG. 8A), and electron beam current (FIG. 8B) for different applied voltages ranging from 0-600 kV and magnetic fields of $\vec{B}$=0.5,1,2,3 T, respectively, for a total simulation time of 10 ns. For both plots, the inner beam's radius is $$r_{ib} = \frac{3}{4} r_{ob},$$

in accordance with the present disclosure. When evaluating the dependence of the electron beam parameters for different values of applied magnetic field ($\vec{B}$=0.5 T, $\vec{B}$=1 T, $\vec{B}$=2 T, $\vec{B}$=3 T), the results are consistent between analytic predictions and the numerical simulation, as shown in FIGS. 8A and 8B. Both FIGS. 8A and 8B show agreement between analytical calculations and simulations with different magnetic fields. At lower applied voltages (i.e., at 100 kV) both curves overlap meaning there is no energy difference, but at higher applied voltages>100 kV, both beams start apart from each other and more energy difference can be observed. Similar trends can be seen in FIG. 8B, where both electron beams appear to be of the same value at 100 kV and 400 kV but as the potential is increased, the outer electron beam current tends to be higher than the inner beam. Both plots illustrate that analytic and simulation results do not show significant difference of more than a few keV or a few amps with different magnetic fields. Of key interest is the geometry where $$r_{ib} = \frac{3}{4} r_{ob}$$

and at 400 KV consistent results are exhibited for different magnetic fields where comparable currents and more than 10% energy difference can be achieved.

FIGS. 9A and 9B show plots depicting the analytically calculated and MAGIC PIC simulated 'inner' and 'outer' electron beam current and energy as a function of applied voltages for $\vec{B}$=0.5 T and $$r_{ib} = \frac{1}{4} r_{ob}$$

(FIG. 9A), and $\vec{B}$=0.5 T and $$r_{ib} = \frac{1}{2} r_{ob}$$

(FIG. 9B), in accordance with the present disclosure. Other radial positions $$\left(\text{i.e., } r_{ib} = \frac{1}{4} r_{ob} \text{ and } r_{ib} = \frac{1}{2} r_{ob}\right)\Big)$$

of the inner beam w.r.t outer beam have been investigated, as shown in FIG. 9. Both analytically calculated and simulation currents show agreement; the outer electron beam energy shows excellent agreement for both cases, the inner electron beam energy simulation curves show a little difference from the analytical calculations. In this case, it is important to note that, at higher applied voltages, the gap between the two electron beam currents increases as the difference between energies increases. The trend for the difference between 'inner' and 'outer' electron beam currents and energies indicates that the radial difference between the two cathodes and their relative axial separation are key factors in determining what can lead to two electron beams with comparable currents and maximum energy difference.

Next, the electron beam density and plasma frequency as a function of the inner cathode radius for the applied voltage of 400 kV are explored, as these are critical parameters in designing a multi-stream TWT. Electron density is calculated for the inner and outer electron beams from the relationships between charge density, current density, and electron velocity, given by, $$n_{e_{ib}} = \frac{I_{ib}\gamma_{ib}}{e_0 A_{ib} c \sqrt{\gamma_{ib}^2 - 1}} \tag{10}$$

and $$n_{e_{ob}} = \frac{I_{ob}\gamma_{ob}}{e_0 A_{ob} c \sqrt{\gamma_{ob}^2 - 1}} \tag{11}$$

Figure 10B:
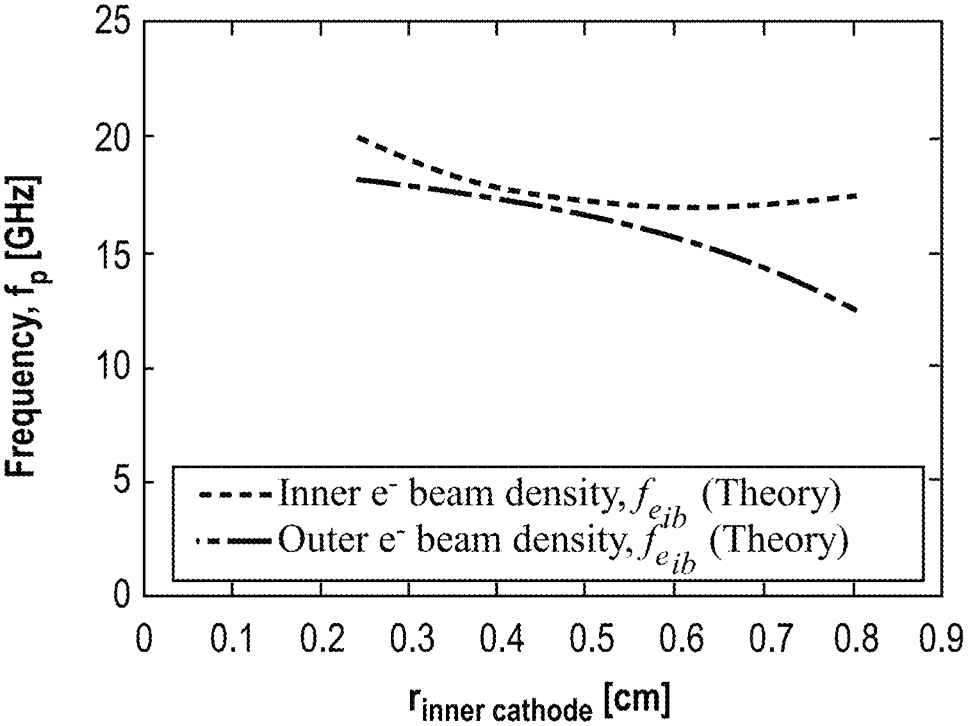

FIGS. 10A and 10 B show plots depicting the calculated 'inner' and 'outer' electron beam density (FIG. 10A), and 'inner' (dotted red) and 'outer' (blue dash) electron beam plasma frequency (FIG. 10B) for the applied potential of 400 kV as a function of the radius of the inner beam $r_{ib}$, in accordance with the present disclosure. It is determined that the electron plasma frequency corresponding to the 'inner' and 'outer' electron beams using the relation between electron density and electron plasma frequency that is given by $$\omega_{p_{ib}} = \sqrt{\frac{n_{e_{ib}} e_0^2}{m_0 \epsilon_0}}, \quad (12)$$

$$\omega_{p_{ob}} = \sqrt{\frac{n_{e_{ob}} e_0^2}{m_0 \epsilon_0}}, \quad (13)$$

where the plasma frequency can also be calculated by $$\frac{w_p}{2\pi} = f_p \approx 9\sqrt{n_e}\left(n_e \text{ in } m^{-3}\right).$$

FIGS. 10A and 10B shows the electron density and electron plasma frequency as a function of the inner beam's radius where 'inner' and 'outer' denote electron beam density as a function of the inner beam's radius for an applied voltage of 400 kV. FIG. 10A shows the 'inner' and 'outer' electron beam density for an applied voltage of 400 kV as a function of the inner beam radius $r_{ib}$ and FIG. 10B shows the corresponding plot for plasma frequency. In this case, the outer electron beam plasma frequency is lower than the inner electron beam plasma frequency. An explanation for this is that, without being bound by any particular theory, since the radius of the inner electron beam is less than the outer electron beam radius, its current density is greater, resulting in a higher plasma frequency.

FIG. 11 is a plot depicting a calculated dimensionless velocity β for the inner and outer electron beams as a function of $r_{ic}$ for an applied potential 400 kV, in accordance with the present disclosure. The dimensionless 'inner' and 'outer' electron beam velocities as a function of $r_{ib}$ can be seen in FIG. 11, where $$\beta_{ib} = \frac{1}{\gamma_{ib}}\sqrt{\gamma_{ib}^2 - 1} \text{ and } \beta_{ob} = \frac{1}{\gamma_{ob}}\sqrt{\gamma_{ob}^2 - 1}$$

correspond to the 'inner' and 'outer' electron beam dimensionless velocities, respectively. In FIG. 11, the x-axis represents the inner cathode radial position from 0.24 cm to 0.81 cm and the y-axis represents the β value from 0 to 1. The 'blue dash dot' and the 'dotted red' lines show the analytically calculated dimensionless velocities $\beta_{ob}$ for the outer and $\beta_{ib}$ inner electron beams, respectively, as a function of $r_{ib}$ for an applied voltage of 400 kV. At the inner cathode radius $r_{ic}$=0.69 cm, the β value for the outer electron beam is $\beta_{ob}$=0.7187 and the β value for the inner electron beam is $\beta_{ib}$=0.6941. The velocity for the two beams are in this case $\gamma_{ob}$=2.16×10$^8$ m/s (outer) and $v_{ib}$=2.08×10$^8$ m/s (inner), respectively.

The present disclosure provides a study of multi-electron beam generation with different energies from a single cathode at a single potential, demonstrating the generation of two beams with comparable currents and with an energy difference of about 6-27% with applications to a multi-stream TWT. A combination of comprehensive quantitative and qualitative approaches has been used to analyze the data from both simulation and analytical theory. One notable finding to emerge from both analytical theory and simulation results is that at a certain value of inner cathode radius and certain axial extent of the inner cathode compared to the outer cathode, the beam 'currents' for both inner and outer electron beam are comparable and that greater than 10% energy difference can be achieved. This is desirable for a multi-stream TWT amplifier. With a single beam, amplification of, for example, microwave radiation, increases exponentially, but with multiple beams, super exponential gain can be achieved, as two beams with comparable current of approximately a 10% difference, creates an instability, which enhances amplification in the TWT. This can enable TWT amplifiers for use in satellite communications, or other high-powered TWT applications. It should be noted that this technique for generating two electron beams with ~10% difference in energies and comparable currents from two MICDs on a cathode stalk at a single potential is most effective when the beams have significant space charge. This restricts the parameter range of feasibility to, roughly, voltages>100 kV and currents>1 kA.

While the present teachings or techniques have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

What is claimed is:

1. A method for generating multi-stream electron beams, comprising connecting an inner cathode to a cathode stalk;

connecting an outer cathode to the cathode stalk;

driving the cathode stalk with a pulsed power generator at a single potential;

producing a first electron beam from the inner cathode; and producing a second electron beam from the outer cathode.

2. The method for generating multi-stream electron beams of claim 1, wherein each of the inner cathode and the outer cathode comprise nested magnetically insulated coaxial diodes (MICDs).

3. The method for generating multi-stream electron beams of claim 1, wherein the first electron beam and the second electron beam are generated with different energies.

4. The method for generating multi-stream electron beams of claim 3, wherein the first electron beam and the second electron beam have an energy difference of from about 5% to about 30%.

5. The method for generating multi-stream electron beams of claim 4, wherein the first electron beam and the second electron beam have an energy difference of about 10%.

6. The method for generating multi-stream electron beams of claim 1, wherein the first electron beam and the second electron beam are each generated with a comparable current.

7. The method for generating multi-stream electron beams of claim 1, further comprising applying a voltage to the cathode stalk of from about 100 kV to about 500 kV.

8. The method for generating multi-stream electron beams of claim 1, further comprising generating an electron beam density of from about $2\times10^{12}/cm^3$ to about $6\times10^{12}/cm^3$.

9. The method for generating multi-stream electron beams of claim 1, wherein a radius of the inner beam ($r_{ib}$) is from about 0.25 cm to about 0.8 cm with 0.02 cm thickness.

10. The method for generating multi-stream electron beams of claim 1, wherein a radius of the inner cathode ($r_{ic}$) is from about 0.25 cm to about 0.8 cm, with a thickness of 0.02 cm.

11. The method for generating multi-stream electron beams of claim 1, a radius of the inner cathode ($r_{ic}$) is 0.7 cm, with a thickness of 0.02 cm.

12. The method for generating multi-stream electron beams of claim 1, wherein a radius of the outer beam ($r_{ob}$) is 0.9 cm, with a 0.02 cm thickness.

13. A multi-stream traveling wave tube (TWT), comprising:

a cathode stalk;

an inner cathode coupled to the cathode stalk; and an outer cathode coupled to the cathode stalk; and wherein a first electron beam and a second electron beam generated by the multi-stream traveling wave tube (TWT) have an energy difference of from about 5% to about 30%.

14. An electron beam generating apparatus, comprising:

a cathode stalk;

an inner cathode coupled to the cathode stalk; and an outer cathode coupled to the cathode stalk; and wherein a first electron beam and a second electron beam generated by the electron beam generating apparatus have an energy difference of from about 5% to about 30%.

15. The electron beam generating apparatus of claim 14, wherein a radius of the inner cathode is different from a radius of the outer cathode.

16. The electron beam generating apparatus of claim 14, further comprising a pulsed power generator configured to apply a voltage of from about 100 kV to about 500 kV to the cathode stalk.

17. The electron beam generating apparatus of claim 14, wherein:

a radius of the inner cathode ($r_{ic}$) is from about 0.25 cm to about 0.8 cm; and a radius of the outer cathode ($r_{oc}$) is 0.9 cm with a thickness of 0.02 cm.

18. The electron beam generating apparatus of claim 14, wherein:

a radius of the inner cathode ($I_{ib}$) is 0.675 cm; and a radius of the outer cathode ($I_{ob}$) is 0.9 cm.

* * * * *